United States Patent
Dejesus et al.

(10) Patent No.: US 12,352,375 B2
(45) Date of Patent: Jul. 8, 2025

(54) COUPLING FOR PIPES, FLUID FLOW SYSTEM INCLUDING THE COUPLING, AND METHOD OF REDUCING CONTAMINATION OF WATER

(71) Applicant: Purifico Corp., Forest Park, IL (US)

(72) Inventors: Radames Dejesus, Forest Park, IL (US); Richard E. Nawracaj, Burr Ridge, IL (US); Ralph Bonanotte, Mokena, IL (US)

(73) Assignee: PURIFICO CORP., Forest Park, IL (US)

( * ) Notice: Subject to any disclaimer, the term of this patent is extended or adjusted under 35 U.S.C. 154(b) by 0 days.

(21) Appl. No.: 18/164,504

(22) Filed: Feb. 3, 2023

(65) Prior Publication Data

US 2023/0279973 A1    Sep. 7, 2023

Related U.S. Application Data

(60) Provisional application No. 63/373,855, filed on Aug. 29, 2022, provisional application No. 63/307,605, filed on Feb. 7, 2022.

(51) Int. Cl.
*F16L 15/04*      (2006.01)
*F16L 33/22*      (2006.01)
*F16L 33/24*      (2006.01)

(52) U.S. Cl.
CPC ............ *F16L 33/223* (2013.01); *F16L 33/24* (2013.01)

(58) Field of Classification Search
CPC ......... F16L 15/04; F16L 33/226; F16L 33/24; F16L 15/006; F16L 58/00; F16L 55/1604;
(Continued)

(56) References Cited

U.S. PATENT DOCUMENTS 1,186,722 A * 6/1916 Young ............ F16L 33/24
                                                        285/342
1,266,416 A    5/1918 Davis
(Continued)

FOREIGN PATENT DOCUMENTS

CA      2 939 627 A1    2/2018
DE      2714738 A1 * 10/1978
(Continued)

OTHER PUBLICATIONS

European Patent Office, International Search Report in International Application No. PCT/EP2023/072810 (Nov. 17, 2023).
(Continued)

*Primary Examiner* — Zachary T Dragicevich
*Assistant Examiner* — James A Linford
(74) *Attorney, Agent, or Firm* — Leydig, Voit & Mayer, Ltd.

(57) ABSTRACT

A method and a system which includes a semi-rigid pipe (SRP) disposed inside a first existing pipe and two coupling assemblies disposed over and sealingly coupled to the ends of the SRP. Each assembly includes: a coupling with a nipple configured to receive and be disposed inside the SRP; and a compression nut that includes an inner surface that tapers inward such that threading the compression nut onto the coupling presses the semi-rigid pipe against the nipple to form a fluid-tight seal. Also disclosed is a supersystem comprising a plurality of such systems.

29 Claims, 21 Drawing Sheets

(58) Field of Classification Search
CPC . F16L 55/165; F16L 58/1009; F16L 58/1027; F16L 19/028; F16L 19/0286; F16L 2101/18; F16L 55/1651; F16L 55/1652; F16L 55/1656; F16L 33/223
See application file for complete search history.

(56) References Cited

U.S. PATENT DOCUMENTS

| | | | | |
|---|---|---|---|---|
| 2,029,846 | A | * | 2/1936 | Von Henke ............. F16L 33/24 285/251 |
| 3,684,319 | A | | 8/1972 | Samartina |
| 3,722,925 | A | | 3/1973 | Robbins |
| 4,166,479 | A | | 9/1979 | Cleavenger |
| 4,169,967 | A | | 10/1979 | Bachle |
| 6,386,594 | B1 | | 5/2002 | Schüttler et al. |
| 9,360,149 | B2 | | 6/2016 | Lesage |
| 2004/0144441 | A1 | | 7/2004 | Connor et al. |
| 2004/0212191 | A1 | | 10/2004 | Segal et al. |
| 2009/0026757 | A1 | | 1/2009 | Borland |
| 2013/0181445 | A1 | | 7/2013 | Glime et al. |
| 2015/0069753 | A1 | | 3/2015 | Goess-Saurau et al. |
| 2019/0277431 | A1 | * | 9/2019 | Shemtov ............. H02G 3/0481 |
| 2023/0279978 | A1 | * | 9/2023 | Abrams ............. F16L 55/005 285/382.4 |

FOREIGN PATENT DOCUMENTS

| | | | | |
|---|---|---|---|---|
| DE | 19538139 | A1 | * 4/1997 | ............. F16L 33/24 |
| DE | 20 2012 002 893 | U1 | 6/2012 | |
| EP | 0 439 898 | A2 | 8/1991 | |
| FR | 481827 | A | * 1/1917 | |
| FR | 768968 | A | * 8/1934 | |
| GB | 102847 | A | * 1/1917 | |

OTHER PUBLICATIONS

European Patent Office, Written Opinion in International Application No. PCT/EP2023/072810 (Nov. 17, 2023).

Fletcher, Steven, "RV Plumbing Repair: PEX Tubing and Fittings", https://rvtipoftheday.com/rv-repair/rv-plumbing-repair-pex-tubing-and-fittings/, pp. 1-17 (2013), printed on May 17, 2023.

Misumi Corporation, "Male Pipe Adapter—NPTF / NPSM Swivel, 0107 Series (Parker Hannifin) (0107-2-2)", https://us.misumi-ec.com/vona2/detail/221302296973/?HissuCode=0107-2-2&gclid=EAlalQobChMlsbHlnP689wIVhmpvBB3PIA8JEAQYCSABEgLcxvD_BwE, pp. 1-3, printed on May 3, 2023.

Purifico Corp., "Purifico SinPlomo™ Technical Data | Specification | Installation Procedures", pp. 1-24 (Jul. 20, 2022).

* cited by examiner

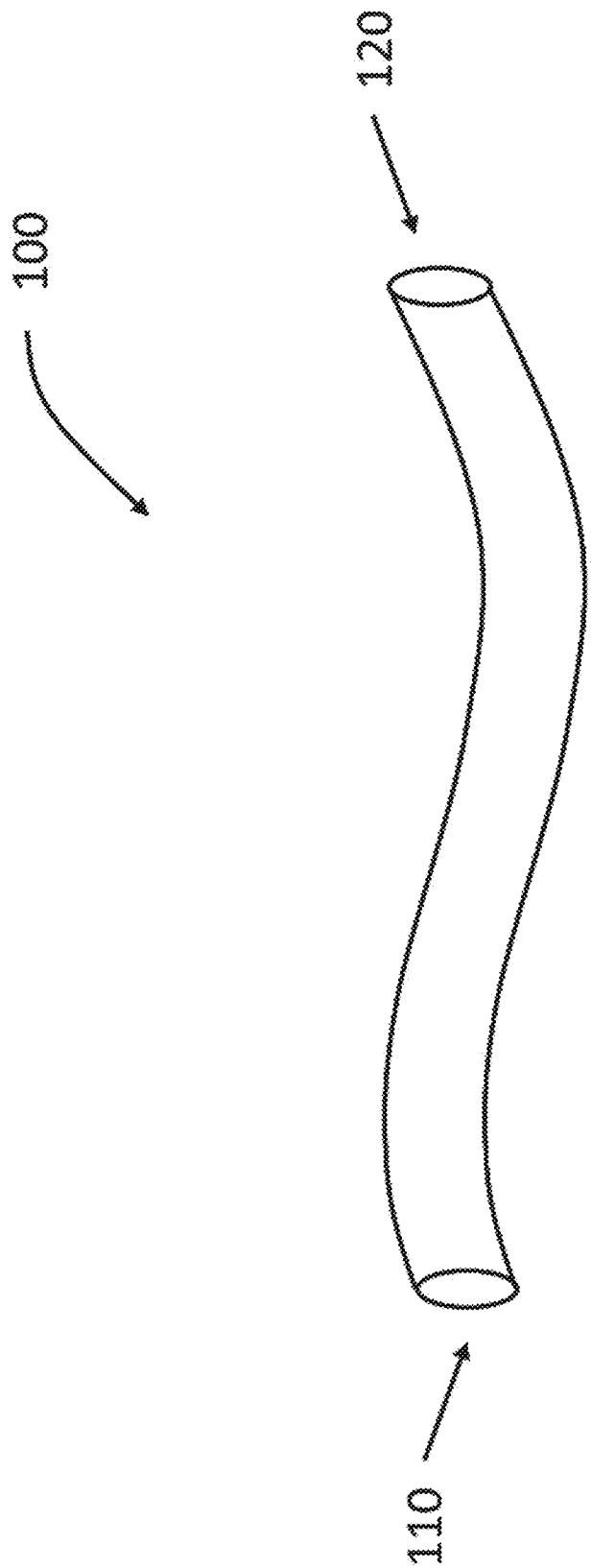

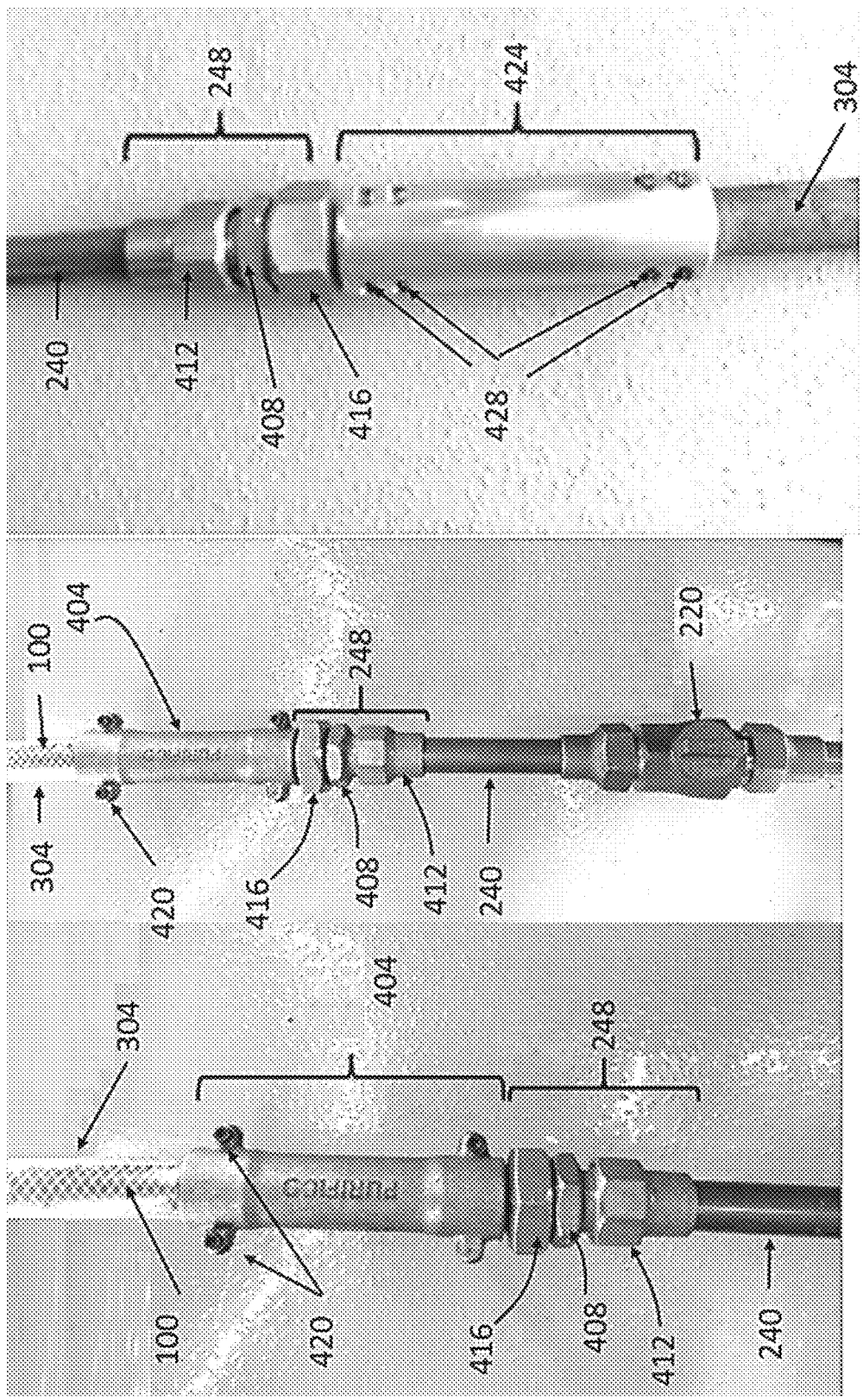

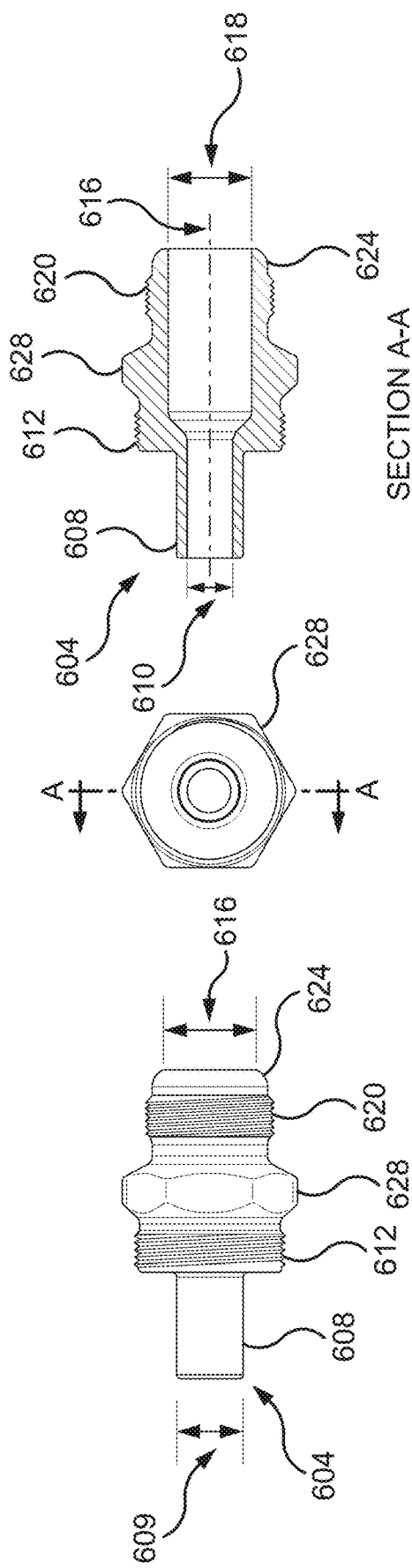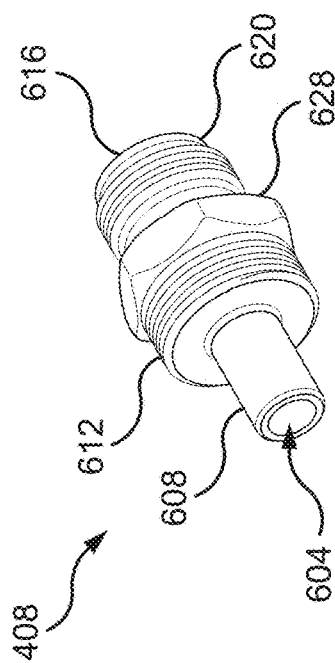

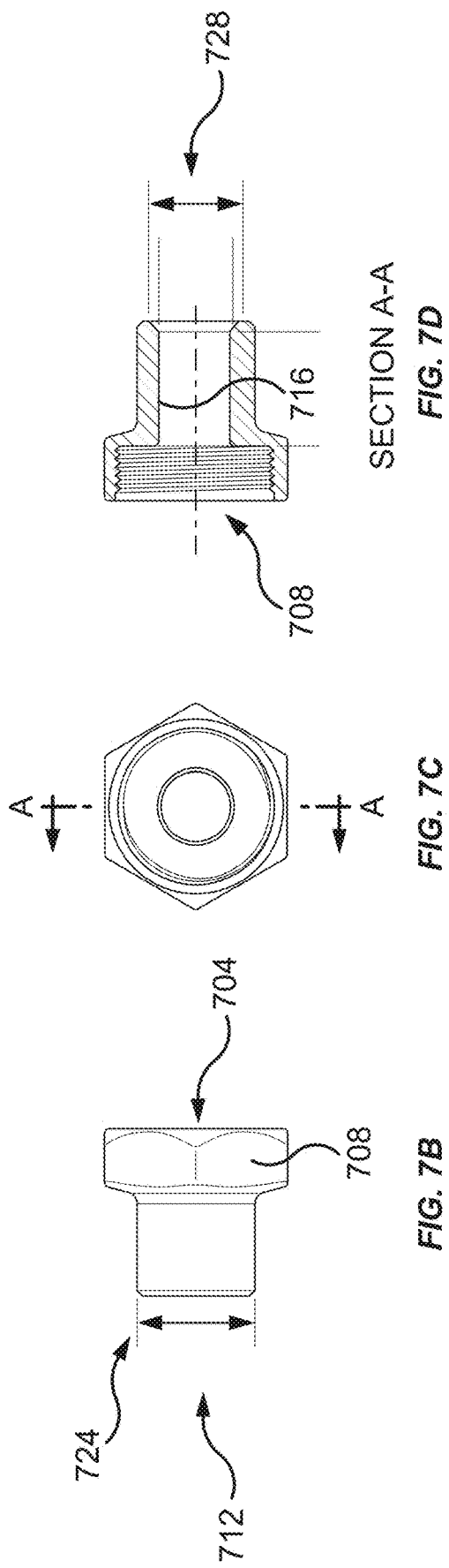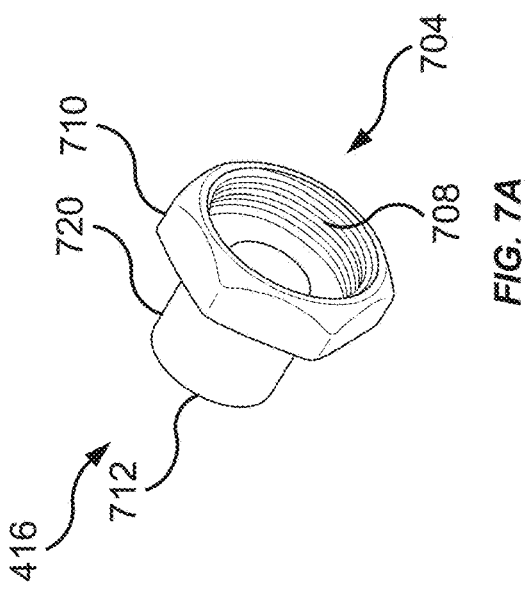
FIG. 7A  FIG. 7B  FIG. 7C  FIG. 7D SECTION A-A

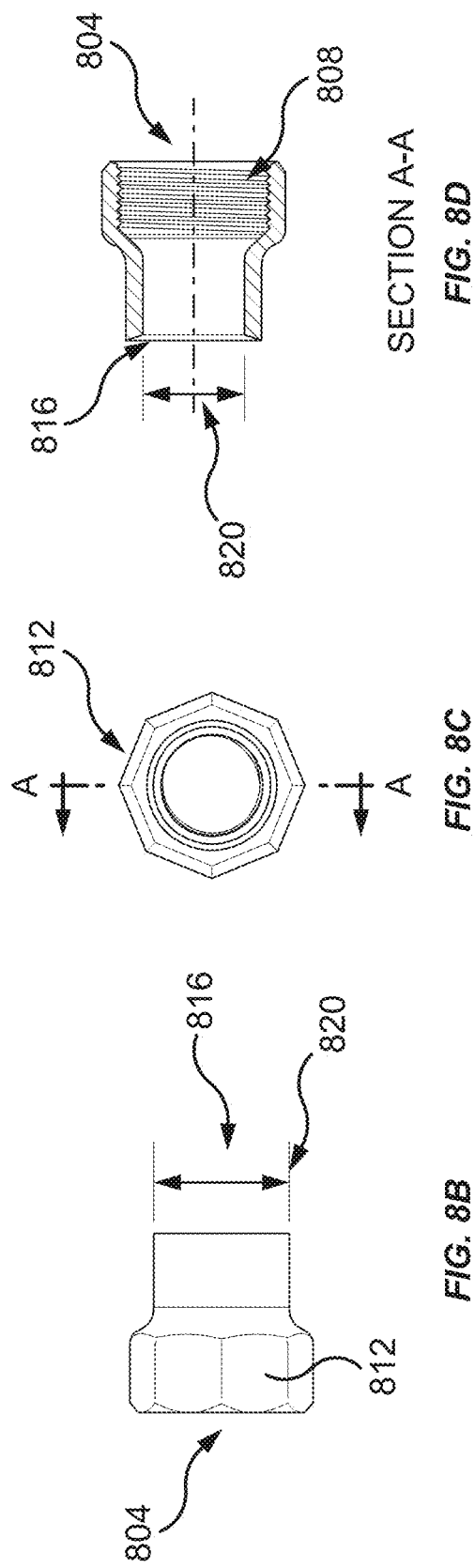
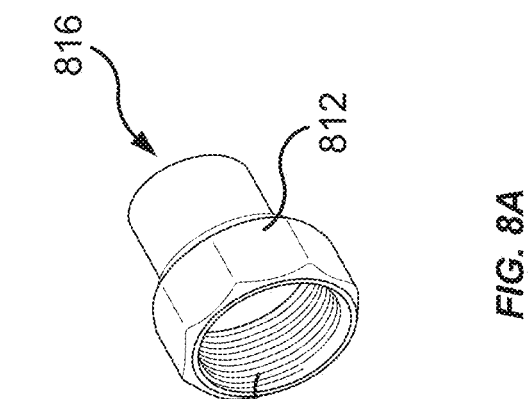

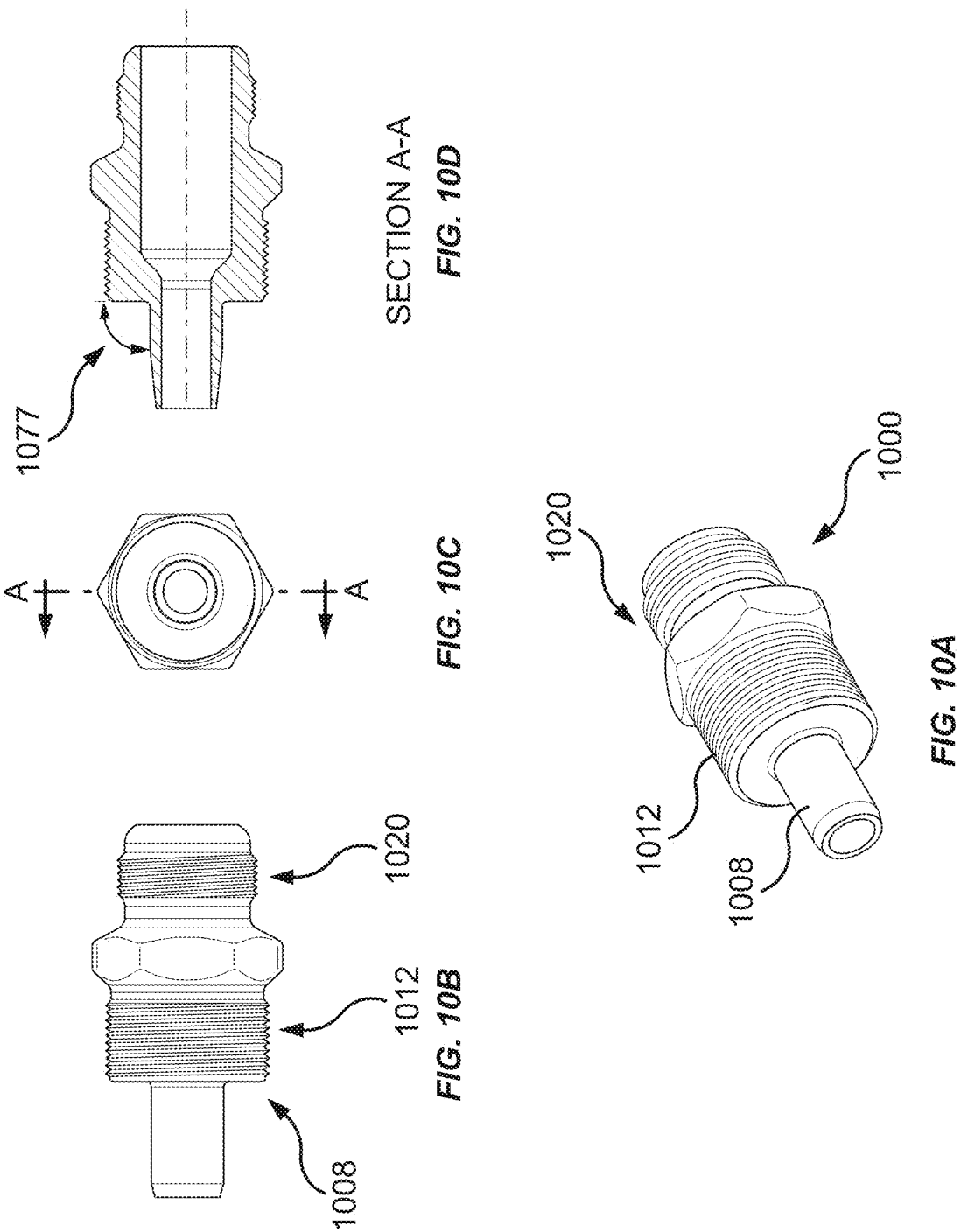

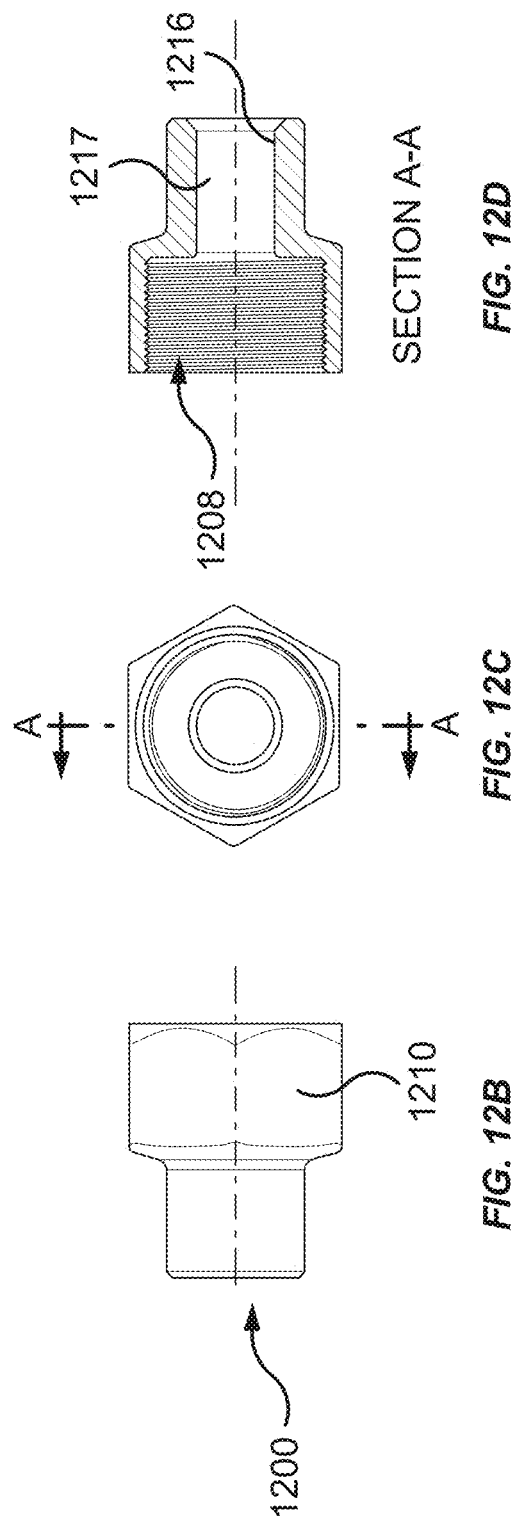
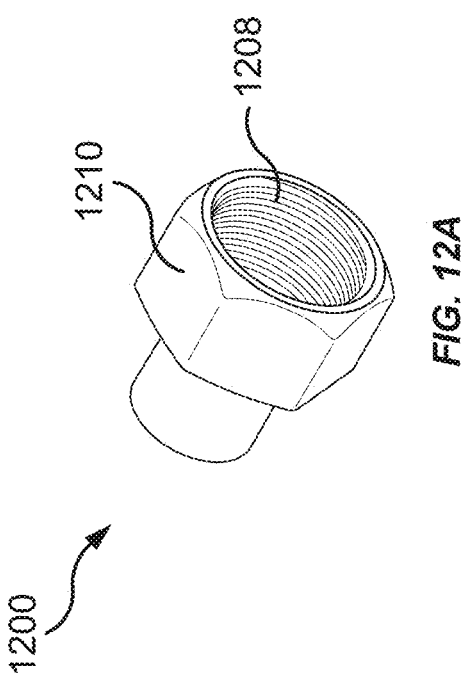

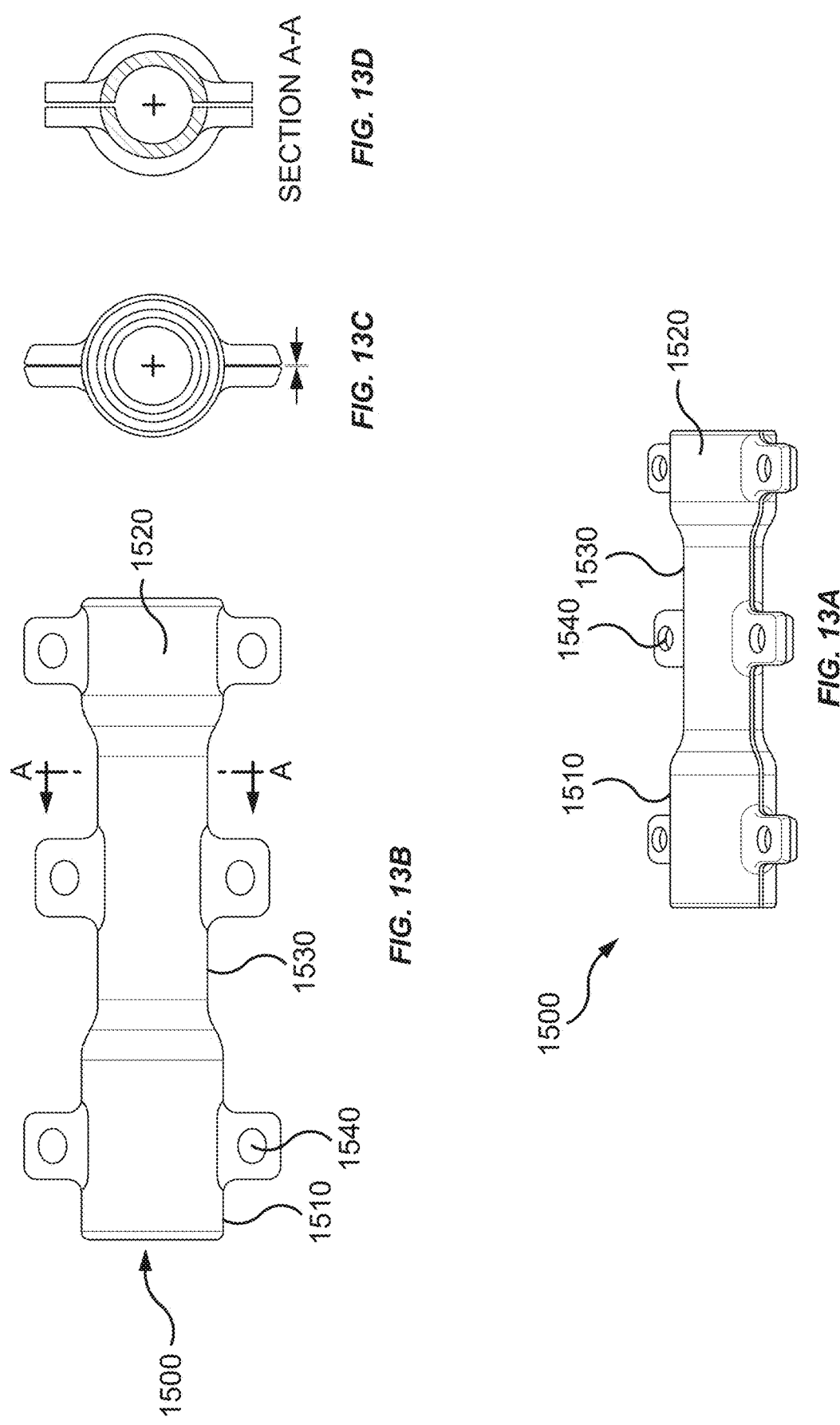

COUPLING FOR PIPES, FLUID FLOW SYSTEM INCLUDING THE COUPLING, AND METHOD OF REDUCING CONTAMINATION OF WATER

CROSS-REFERENCE TO RELATED APPLICATIONS

This patent application claims the benefit of U.S. Provisional Patent Application No. 63/307,605, filed Feb. 7, 2022, and U.S. Provisional Patent Application No. 63/373,855, filed Aug. 29, 2022, which are incorporated herein by reference in their entireties for all purposes.

BACKGROUND

Pipes that are not easily or economically accessible can need to be replaced for several reasons. As a non-limiting example, water pipes running underground between a water main and a residence can be buried several feet below the ground surface. Further, these pipes can contain lead (Pb) or other harmful substances that contaminate residential drinking, cooking, and bathing water. Further, aging pipes, including aging lead pipes can be deteriorating with hairline fractures, cracks, and voids. Communities, governments, water authorities, and other entities seek to reduce water contamination and the resulting loss in a fiscally-responsible manner.

BRIEF SUMMARY OF THE INVENTION

One or more aspects of the present invention provide a system comprising: a semi-rigid pipe comprising a flexible tube with a first end and a second end opposite the first end, the semi-rigid pipe configured to be disposed inside a first existing pipe; a pair of coupling assemblies comprising first and second coupling assemblies disposed over and sealingly coupled to the first and second ends, respectively, of the semi-rigid pipe, each coupling assembly comprising: a coupling comprising: a coupling proximal end including: a nipple with a first outer diameter and configured to receive by friction-tight fit and be disposed inside the semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with one of two additional existing pipes; an intermediary section disposed between the first external thread and the second external thread and configured to allow the coupling to be held and threaded securely; and a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers inward from the compression nut distal end to the compression nut proximal end such that threading the compression nut onto the coupling presses the semi-rigid pipe against the nipple to form a fluid-tight seal, wherein the system is configured to be fluid-tight from the first additional existing pipe to the second additional existing pipe, providing a channel for fluid flow between the two additional existing pipes, and wherein proximal and distal refer to position relative to the semi-rigid pipe.

One or more aspects of the present disclosure provide a method that comprises: providing the system of the first aspect; passing the semi-rigid pipe through the first existing pipe; coupling the semi-rigid pipe at each end of the semi-rigid pipe to a respective pipe of the additional existing pipes using a respective coupling assembly of the pair of coupling assemblies by: sliding the compression nut over the respective end of the semi-rigid pipe; connecting the distal end of the coupling to the respective additional existing pipe; sliding the semi-rigid pipe over the nipple; threading the compression nut onto the coupling, pressing the semi-rigid pipe onto the nipple; and wherein the system is configured to be fluid-tight from the first additional existing pipe to the second additional existing pipe, wherein proximal and distal refer to position relative to the semi-rigid pipe, and wherein the system is configured to form a fluid-tight seal from a first to a second of the two additional existing pipes, providing a channel for fluid flow between the two additional existing pipes.

One or more aspects of the present disclosure provide a coupling assembly comprising: a coupling comprising: a coupling proximal end including: a nipple with a first outer diameter and configured to receive by friction-tight fit and be disposed inside a semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with a first existing pipe; an intermediary section disposed between the first external thread and the second external thread and configured to allow the coupling to be held and threaded securely; and a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers down from the compression nut distal end to the compression nut proximal end such that threading the compression nut onto the coupling presses the semi-rigid pipe against the nipple to form a fluid-tight seal, wherein the coupling assembly is configured to be disposed over and sealingly coupled to an end of the semi-rigid pipe, wherein proximal and distal refer to position relative to the semi-rigid pipe, and wherein the coupling assembly is configured to form a fluid-tight seal from the semi-rigid pipe to a second existing pipe disposed, providing a channel for fluid flow between the semi-rigid pipe and a second existing pipe disposed at the distal end of the coupling. In one or more aspects, the taper on the inner surface is smooth.

One or more aspects of the present disclosure provide a method comprising: providing a system configured for fluid flow, the system comprising: a semi-rigid pipe comprising a flexible tube with a first end and a second end opposite the first end, the semi-rigid pipe configured to be disposed inside the at least one underground pipe; a pair of coupling assemblies comprising first and second assemblies disposed over and sealingly coupled to the first and second ends, respectively, of the semi-rigid pipe, each assembly comprising: a coupling comprising: a coupling proximal end including: a nipple with a first outer diameter and configured to receive by friction-tight fit and be disposed inside the semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with one of two additional existing pipes; an intermediary section disposed between the first external thread and the second external thread and configured to allow the coupling to be held and threaded securely; a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers inward from the compression nut distal end to the compression nut proximal end such that threading the compression nut onto the coupling presses the semi-rigid pipe against the nipple to form a fluid-tight seal, passing the semi-rigid pipe through the at least one underground pipe; coupling the semi-rigid pipe at each end of the semi-rigid pipe to a respective pipe of the additional existing pipes using a respective coupling assembly of the pair of coupling assemblies by: sliding the compression nut over the respective end of the semi-rigid pipe; connecting the distal end of the coupling to the respective additional existing pipe; sliding the semi-rigid pipe over the nipple; and threading the compression nut onto the coupling, pressing the semi-rigid pipe onto the nipple, wherein the system is configured to be fluid-tight from the first additional existing pipe to the second additional existing pipe, providing a channel for fluid flow between the two additional existing pipes; and wherein proximal and distal refer to position relative to the semi-rigid pipe.

One or more aspects of the present disclosure provide a system comprising: a semi-rigid pipe comprising a flexible tube with a first end and a second end opposite the first end, the semi-rigid pipe configured to be disposed inside an existing lead pipe; a pair of coupling assemblies comprising first and second assemblies disposed over and sealingly coupled to the first and second ends, respectively, of the semi-rigid pipe, each assembly comprising: a coupling comprising: a coupling proximal end including: a nipple with a first outer diameter and configured to receive by friction-tight fit and be disposed inside the semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with one of two additional existing pipes; an intermediary section disposed between the first external thread and the second external thread and configured to allow the coupling to be held and threaded securely; and a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers inward from the compression nut distal end to the compression nut proximal end such that threading the compression nut onto the coupling presses the semi-rigid pipe against the nipple to form a fluid-tight seal, wherein the system is configured to be fluid-tight from the first additional existing pipe to the second additional existing pipe, providing a channel for fluid flow between the two additional existing pipes; and wherein proximal and distal refer to position relative to the semi-rigid pipe.

BRIEF DESCRIPTION OF THE DRAWINGS

FIG. 1A depicts a semi-rigid pipe in accordance with one or more aspects of the invention.

FIGS. 4A-4D present various views of coupling assemblies and sleeves in accordance with one or more aspects of the invention.

FIGS. 6A-6D depict a coupling for mating with a flared pipe in perspective, side, end, and cross-sectional views, respectively, in accordance with one or more aspects of the invention.

FIGS. 7A-7D depict a compression nut in perspective, side, end, and cross-sectional views, respectively, in accordance with one or more aspects of the invention.

FIGS. 8A-8D depict a flare nut in perspective, side, end, and cross-sectional views, respectively, in accordance with one or more aspects of the invention.

FIGS. 10A-10D depict another coupling, with a tapered nipple, in perspective, side, end, and cross-sectional views, respectively, in accordance with one or more aspects of the invention.

FIGS. 12A-12D depict another compression nut in perspective, side, end, and cross-sectional views, respectively, in accordance with one or more aspects of the invention.

FIGS. 13A-13D depict another sleeve in perspective, plan, end, and cross-sectional views, respectively, in accordance with one or more aspects of the invention.

DETAILED DESCRIPTION OF ASPECTS OF THE INVENTION

Figure 1B:
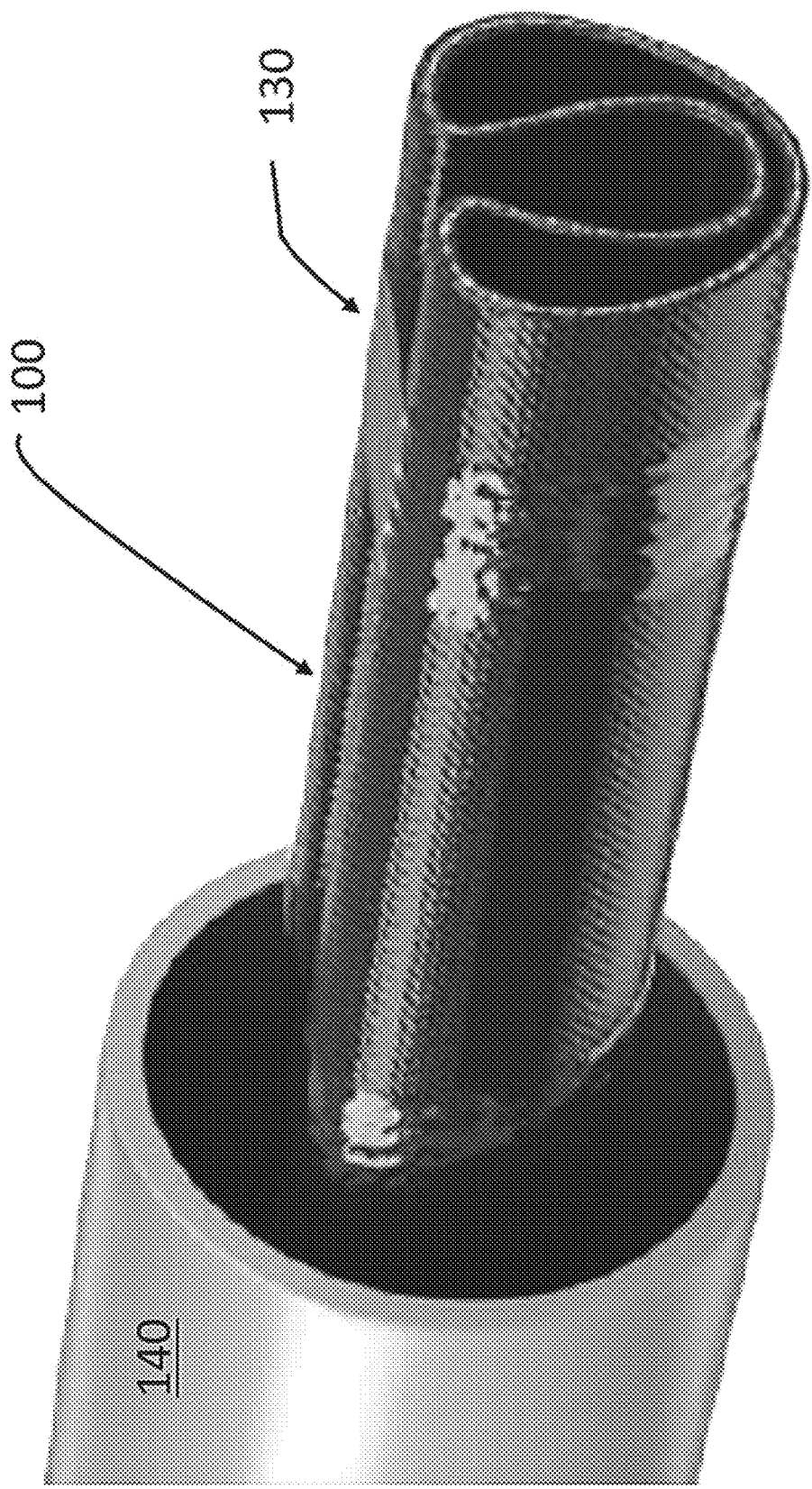
FIG. 1B depicts a semi-rigid pipe inserted into another pipe in accordance with one or more aspects of the invention.

Municipal water systems supply water through a system of reservoirs, aqueducts, pipes, and the like. Commonly, a water main line, or "water main" is buried along a road, either underneath the road or alongside the road. Burial depths can vary due to climate of the particular area. In front of residential or commercial structures ("consumers"), a box is inserted to allow the consumer to receive water from the municipal water system. This box is variously known as a Buffalo box (or b-box, for short), a curb box, a valve box, or some similar designation.

In many communities, the pipe running from the b-box to the consumer can contain or can be made of lead, which is known for its toxicity. For other consumers, the pipe coming from the b-box can be corroded and in need of replacement.

Excavating to uncover such pipes, removing, and replacing them can be costly, time-consuming, damaging to building foundations and landscaping, disruptive to motor and foot traffic, and a potential safety and/or environmental hazard.

One or more aspects of the present disclosure provide a system, a device, and a method capable of remediating toxic and/or decaying water infrastructure from the water main to the b-box as well as from the b-box to the house while reducing or eliminating many or all of the drawbacks of excavating to remove and replace a pipe.

Rather than excavating a pipe to remove it, one can instead disconnect the lead pipe at both ends and insert a semi-rigid pipe (SRP) through the pipe to be bypassed. This method can prevent lead or other contaminants from entering the water and water from leaking out. Coupling assemblies at either end of the semi-rigid pipe can be used to join the semi-rigid pipe to the existing pipes (or other type of plumbing) at either end, for instance, to the b-box at the outdoor, or external, end and the water meter or other indoor plumbing in the house (the internal end), perhaps the basement. The coupling assembly at either end can mate to either a threaded or an unthreaded existing pipe. For example, to mate with an unthreaded copper pipe, the end of the copper pipe can be flared and a coupler designed to mate with a flared pipe can be used in the coupling assembly. If the plumbing is threaded, the coupler designed for threaded coupling could be included in the coupling assembly.

In one or more aspects of the invention, the coupling assembly is used in conjunction with a semi-rigid pipe. Any suitable semi-rigid pipe can be used. The semi-rigid pipe can comprise a fibrous material, for example, a woven or non-woven material to be part of or embedded within a flexible pipe to provide adequate tensile strength and flexibility. The semi-rigid pipe provides a permeability barrier to the water being treated. Any suitable woven or non-woven material can be present. For example, the woven or non-woven material can be Kevlar®, glass fibers, aramid fibers, carbon fibers, and the like along with combinations of materials. The flexible pipe material can be any suitable plastic material including polyethylene (PE), polypropylene, polyvinyl chloride, chlorinated PVC, polybutylene, thermoplastic elastomers (TPE), thermoplastic polyurethane (TPU), for example, Elastolan™, each of which could be crosslinked or uncrosslinked.

In an aspect, examples of polymers constituting semi-rigid pipes include Cellulose Acetate Butyrate, ABS, PVDF, RCO, PET, polypropylene, HDPE, thermoplastic polyurethane, and PVC. For example, semi-rigid pipes can have a flex modulus of $0.25 \times 10^5$ psi or higher, in particular from 0.5 to $5 \times 10^5$ psi, or 1 to $3 \times 10^5$ psi. A semi-rigid pipe can be comprised of thermoplastic polyurethane (TPU) elastomer. Properties of one TPU are presented below in Tables 1-3 and FIGS. 16 and 17.

A semi-rigid pipe can also be comprised of other materials such as any woven, extruded and/or coated conduit.

In the present disclosure, a semi-rigid pipe describes a tube capable of varying its shape along its length without undergoing irreversible deformation. Such a tube can have its cross-section deformed, for example, into a U-shape, and return to an expanded shape such as an essentially circular cross-section. Semi-rigid pipes have one or more of the following properties: high resistance to crushing and/or cracking; excellent flex fatigue resistance; high bend radius; increased kinking resistance; and low moisture resistance. A semi-rigid pipe in one non-limiting example can pass through a rigid pipe, such as a metal pipe, that has bends, narrowings, and other variations and not be permanently deformed in the process.

While the present disclosure refers to lead pipes as a non-limiting example of a pipe to be bypassed, other types of pipe can be bypassed by one or more of the disclosed systems, apparatuses, and methods.

The system, including the semi-rigid pipe and the two coupling assemblies, can be National Sanitation Foundation (NSF)-61 approved. More generally, the system can be NSF/ANSI/CAN 61-approved where ANSI is the American National Standards Institute and CAN is the National Standard of Canada.

In a first aspect, a system comprising: a semi-rigid pipe comprising a flexible tube with a first end and a second end opposite the first end, the semi-rigid pipe configured to be disposed inside a first existing pipe; a pair of coupling assemblies comprising first and second coupling assemblies disposed over and sealingly coupled to the first and second ends, respectively, of the semi-rigid pipe, each coupling assembly comprising: a coupling comprising: a coupling proximal end including: a nipple with a first outer diameter and configured to receive by friction-tight fit and be disposed inside the semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with one of two additional existing pipes; an intermediary section disposed between the first external thread and the second external thread and configured to allow the coupling to be held and threaded securely; and a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers inward from the compression nut distal end to the compression nut proximal end such that threading the compression nut onto the coupling presses the semi-rigid pipe against the nipple to form a fluid-tight seal, wherein the system is configured to be fluid-tight from the first additional existing pipe to the second additional existing pipe, providing a channel for fluid flow between the two additional existing pipes, and wherein proximal and distal refer to position relative to the semi-rigid pipe.

In a second aspect, the system of the first aspect, further comprising a sleeve associated with each coupling assembly, each sleeve comprising: a first sleeve end configured to receive and securely clamp over the first existing pipe; and a second sleeve end configured to receive and securely clamp over the proximal end of the compression nut.

In a third aspect, the system of the first aspect, wherein: at least one coupling assembly further comprises a flare nut, the flare nut comprising: an internally threaded proximal end configured to mate with the second external thread of the respective coupling and sealingly connect one of the additional existing pipes to the respective coupling distal end; and an outer surface configured to be held securely to facilitate threading the flare nut over the coupling, wherein at least one additional existing pipe comprises a flared proximal end, and wherein the coupling further comprises a distal end shaped to mate with the flared proximal end of the at least one additional existing pipe.

In a fourth aspect, the system of the first aspect, wherein at least one of the coupling, the compression nut, the nut, and the sleeve comprises at least one of brass, steel, or plastic.

In a fifth aspect, the system of the first aspect, wherein an outer surface of the nipple is smooth.

In a sixth aspect, the system of the first aspect, wherein the sleeve comprises a plurality of shells that when assembled form a tubular shape, and wherein the plurality of shells are held together by a plurality of fasteners.

In a seventh aspect, the system of the sixth aspect, wherein the fasteners comprise bolts configured to be received by complementary holes in adjacent pairs of shells.

In an eighth aspect, the system of the first aspect, wherein the fluid comprises water.

In a ninth aspect, the system of the eighth aspect, wherein the fluid comprises potable water.

In a tenth aspect, the system of the first aspect, wherein the first existing pipe comprises toxic material.

In an eleventh aspect, the system of the first aspect, wherein the first additional existing pipe comprises a Buffalo box of a water supply system and the second additional existing pipe comprises a water line in a residential or commercial structure.

In a twelfth aspect, a method comprising: providing the system of the first aspect; passing the semi-rigid pipe through the first existing pipe; coupling the semi-rigid pipe at each end of the semi-rigid pipe to a respective pipe of the additional existing pipes using a respective coupling assembly of the pair of coupling assemblies by: sliding the compression nut over the respective end of the semi-rigid pipe; connecting the distal end of the coupling to the respective additional existing pipe; sliding the semi-rigid pipe over the nipple; threading the compression nut onto the coupling, pressing the semi-rigid pipe onto the nipple; and wherein the system is configured to be fluid-tight from the first additional existing pipe to the second additional existing pipe, wherein proximal and distal refer to position relative to the semi-rigid pipe, and wherein the system is configured to form a fluid-tight seal from a first to a second of the two additional existing pipes, providing a channel for fluid flow between the two additional existing pipes.

In a thirteenth aspect, the method of the twelfth aspect, further comprising: providing a sleeve comprising: a first sleeve end configured to receive and securely clamp over the first existing pipe; and a second sleeve end configured to receive and securely clamp over the proximal end of the compression nut; and clamping the first and second sleeve ends over the first existing pipe and the proximal end of the compression nut, respectively.

In a fourteenth aspect, the method of the thirteenth aspect, further comprising removing any twist in the semi-rigid pipe.

In a fifteenth aspect, the method of the thirteenth aspect, further comprising at least one flare nut, the at least one flare nut comprising: an internally threaded proximal end configured to mate with the second external thread of the respective coupling and sealingly connect one of the additional existing pipes to the respective coupling distal end; and an outer surface configured to be held securely to facilitate threading the flare nut over the coupling, wherein the coupling further comprises a distal end shaped to mate with the flared proximal end of the at least one additional existing pipe, wherein for at least one coupling assembly, connecting the distal end of the coupling to the respective additional existing pipe comprises: sliding the at least one flare nut over the respective additional existing pipe; flaring the proximal end of the respective additional existing pipe; mating the flared proximal end of the respective additional existing pipe to the distal end of the coupling; and threading the flare nut onto the distal end of the coupling.

In a sixteenth aspect, a coupling assembly comprising: a coupling comprising: a coupling proximal end including: a nipple with a first outer diameter and configured to receive by friction-tight fit and be disposed inside a semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with a first existing pipe; an intermediary section disposed between the first external thread and the second external thread and configured to allow the coupling to be held and threaded securely; and a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers down from the compression nut distal end to the compression nut proximal end such that threading the compression nut onto the coupling presses the semi-rigid pipe against the nipple to form a fluid-tight seal, wherein the coupling assembly is configured to be disposed over and sealingly coupled to an end of the semi-rigid pipe, wherein proximal and distal refer to position relative to the semi-rigid pipe, and wherein the coupling assembly is configured to form a fluid-tight seal from the semi-rigid pipe to a second existing pipe disposed, providing a channel for fluid flow between the semi-rigid pipe and a second existing pipe disposed at the distal end of the coupling.

In a seventeenth aspect, the assembly of the sixteenth aspect, further comprising a flare nut, the flare nut comprising: an internally threaded proximal end configured to mate with the second external thread of the respective coupling and sealingly connect the first existing pipe to the coupling distal end; and an outer surface configured to be held securely to facilitate threading the flare nut onto the coupling, wherein the first existing pipe comprises a flared proximal end, and wherein the coupling further comprises a distal end shaped to mate with the flared proximal end of the first existing pipe.

In an eighteenth aspect, the assembly of the sixteenth aspect, wherein the coupling, the compression nut, the nut, and the sleeve comprises at least one of brass, steel, or plastic.

In a nineteenth aspect, the assembly of the sixteenth aspect, wherein an outer surface of the nipple is smooth.

In a twentieth aspect, the assembly of the sixteenth aspect, wherein the sleeve comprises a plurality of shells that when assembled form a tubular shape, and wherein the plurality of shells are held together by a plurality of fasteners.

In a twenty-first aspect, the assembly of the twentieth aspect, wherein the fasteners comprise bolts configured to be received by complementary holes in adjacent pairs of shells.

In a twenty-second aspect, the assembly of the sixteenth aspect, wherein the fluid comprises water.

In a twenty-third aspect, the assembly of the twenty-second aspect, wherein the fluid comprises potable water.

In a twenty-fourth aspect, a method comprising: providing a system configured for fluid flow, the system comprising: a semi-rigid pipe comprising a flexible tube with a first end and a second end opposite the first end, the semi-rigid pipe configured to be disposed inside the at least one underground pipe; a pair of coupling assemblies comprising first and second assemblies disposed over and sealingly coupled to the first and second ends, respectively, of the semi-rigid pipe, each assembly comprising: a coupling comprising: a coupling proximal end including: a nipple with a first outer diameter and configured to receive by friction-tight fit and be disposed inside the semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with one of two additional existing pipes; an intermediary section disposed between the first external thread and the second external thread and configured to allow the coupling to be held and threaded securely; a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers inward from the compression nut distal end to the compression nut proximal end such that threading the compression nut onto the coupling presses the semi-rigid pipe against the nipple to form a fluid-tight seal, passing the semi-rigid pipe through the at least one underground pipe; coupling the semi-rigid pipe at each end of the semi-rigid pipe to a respective pipe of the additional existing pipes using a respective coupling assembly of the pair of coupling assemblies by: sliding the compression nut over the respective end of the semi-rigid pipe; connecting the distal end of the coupling to the respective additional existing pipe; sliding the semi-rigid pipe over the nipple; and threading the compression nut onto the coupling, pressing the semi-rigid pipe onto the nipple, wherein the system is configured to be fluid-tight from the first additional existing pipe to the second additional existing pipe, providing a channel for fluid flow between the two additional existing pipes; and wherein proximal and distal refer to position relative to the semi-rigid pipe.

In a twenty-fifth aspect, the method of the twenty-fourth aspect; further comprising: providing a sleeve comprising: a first sleeve end configured to receive and securely clamp over the at least one underground pipe; and a second sleeve end configured to receive and securely clamp over the proximal end of the compression nut; and clamping the first and second sleeve ends over the at least one underground pipe and the proximal end of the compression nut, respectively.

In a twenty-sixth aspect, the method of the twenty-fourth aspect, further comprising removing any twist in the semi-rigid pipe.

In a twenty-seventh aspect, the method of the twenty-fourth aspect, further comprising at least one flare nut, the at least one flare nut comprising: an internally threaded proximal end configured to mate with the second external thread of the respective coupling and sealingly connect one of the additional existing pipes to the respective coupling distal end; and an outer surface configured to be held securely to facilitate threading the flare nut over the coupling, wherein the coupling further comprises a distal end shaped to mate with the flared proximal end of the at least one additional existing pipe, wherein for at least one coupling assembly, connecting the distal end of the coupling to the respective additional existing pipe comprises: sliding the at least one flare nut over the respective additional existing pipe; flaring the proximal end of the respective additional existing pipe; mating the flared proximal end of the respective additional existing pipe to the distal end of the coupling; and threading the flare nut onto the distal end of the coupling.

In a twenty-eighth aspect, the system of the first aspect, wherein the semi-rigid pipe comprises at least one of a group comprising cellulose acetate butyrate, ABS, PVDF, RCO, PET, polypropylene, HDPE, thermoplastic polyurethane, and PVC.

In a twenty-ninth aspect, the method of the twelfth aspect, wherein the semi-rigid pipe comprises at least one of a group comprising cellulose acetate butyrate, ABS, PVDF, RCO, PET, polypropylene, HDPE, thermoplastic polyurethane, and PVC.

In a thirtieth aspect, the coupling assembly of the sixteenth aspect, wherein the semi-rigid pipe comprises at least one of a group comprising cellulose acetate butyrate, ABS, PVDF, RCO, PET, polypropylene, HDPE, thermoplastic polyurethane, and PVC.

In a thirty-first aspect, the method of the twenty-fourth aspect, wherein the semi-rigid pipe comprises at least one of a group comprising cellulose acetate butyrate, ABS, PVDF, RCO, PET, polypropylene, HDPE, thermoplastic polyurethane, and PVC.

In a thirty-second aspect, the system of the first aspect, wherein the nipple is tapered to conform to the tapered inner surface of the compression nut.

In a thirty-third aspect, the method of the twelfth aspect, wherein the nipple is tapered to conform to the tapered inner surface of the compression nut.

In a thirty-fourth aspect, the coupling assembly of the sixteenth aspect, wherein the nipple is tapered to conform to the tapered inner surface of the compression nut.

In a thirty-fifth aspect, the method of the twenty-fourth aspect, wherein the nipple is tapered to conform to the tapered inner surface of the compression nut.

In a thirty-sixth aspect, a system comprising: a semi-rigid pipe comprising a flexible tube with a first end and a second end opposite the first end, the semi-rigid pipe configured to be disposed inside an existing lead pipe; a pair of coupling assemblies comprising first and second assemblies disposed over and sealingly coupled to the first and second ends, respectively, of the semi-rigid pipe, each assembly comprising: a coupling comprising: a coupling proximal end including: a nipple with a first outer diameter and configured to receive by friction-tight fit and be disposed inside the semi-rigid pipe; and a first external thread with a diameter greater than an outer diameter of the semi-rigid pipe and disposed at the distal end of the nipple; a coupling distal end disposed opposite the coupling proximal end including a second external thread and configured to form a fluid-tight seal with one of two additional existing pipes; an intermediary section disposed between the first external thread and the second external thread and configured to allow the coupling to be held and threaded securely; and a compression nut comprising: a compression nut distal end that includes: internal threads configured to mate with the first external threads of the coupling; and an outer surface configured to be held securely to allow the compression nut to thread over the coupling; a compression nut proximal end disposed opposite the compression nut distal end; and an inner surface that tapers inward from the compression nut distal end to the compression nut proximal end such that threading the compression nut onto the coupling presses the semi-rigid pipe against the nipple to form a fluid-tight seal, wherein the system is configured to be fluid-tight from the first additional existing pipe to the second additional existing pipe, providing a channel for fluid flow between the two additional existing pipes; and wherein proximal and distal refer to position relative to the semi-rigid pipe.

In a thirty-seventh aspect, a supersystem comprising: a plurality of systems of the first aspect, wherein adjacent systems of the plurality of systems are configured to be disposed on opposite ends of existing plumbing and to allow fluid flow from a first end of the supersystem to a second end of the supersystem.

In a thirty-eighth aspect, the supersystem of the thirty-seventh aspect, wherein the plurality of systems comprises two systems and the existing plumbing comprises a b-box.

FIG. 1A depicts a semi-rigid pipe 100 with a first end 110 and a second end 120 opposite the first end. The SRP can have a lower friction value (e.g., Manning "N" value) than existing pipes through which the SRP passes, creating a smoother conduit for conveyance of fluids like water.

FIG. 1B depicts a semi-rigid pipe 100 collapsed into a U-shape and held in the position with periodic straps 130. The collapsed U-shape allows the semi-rigid pipe 100 to be inserted through a second pipe 140, for example, a lead pipe. Upon pressurizing the semi-rigid pipe 100, the straps 130 will burst and allow the semi-rigid pipe 100 to expand to fill the second pipe 140.

The SRP can fit pipes of ½-inch diameter or greater, though there is no technical reason prohibiting smaller diameter pipes being fit.

Figure 2:
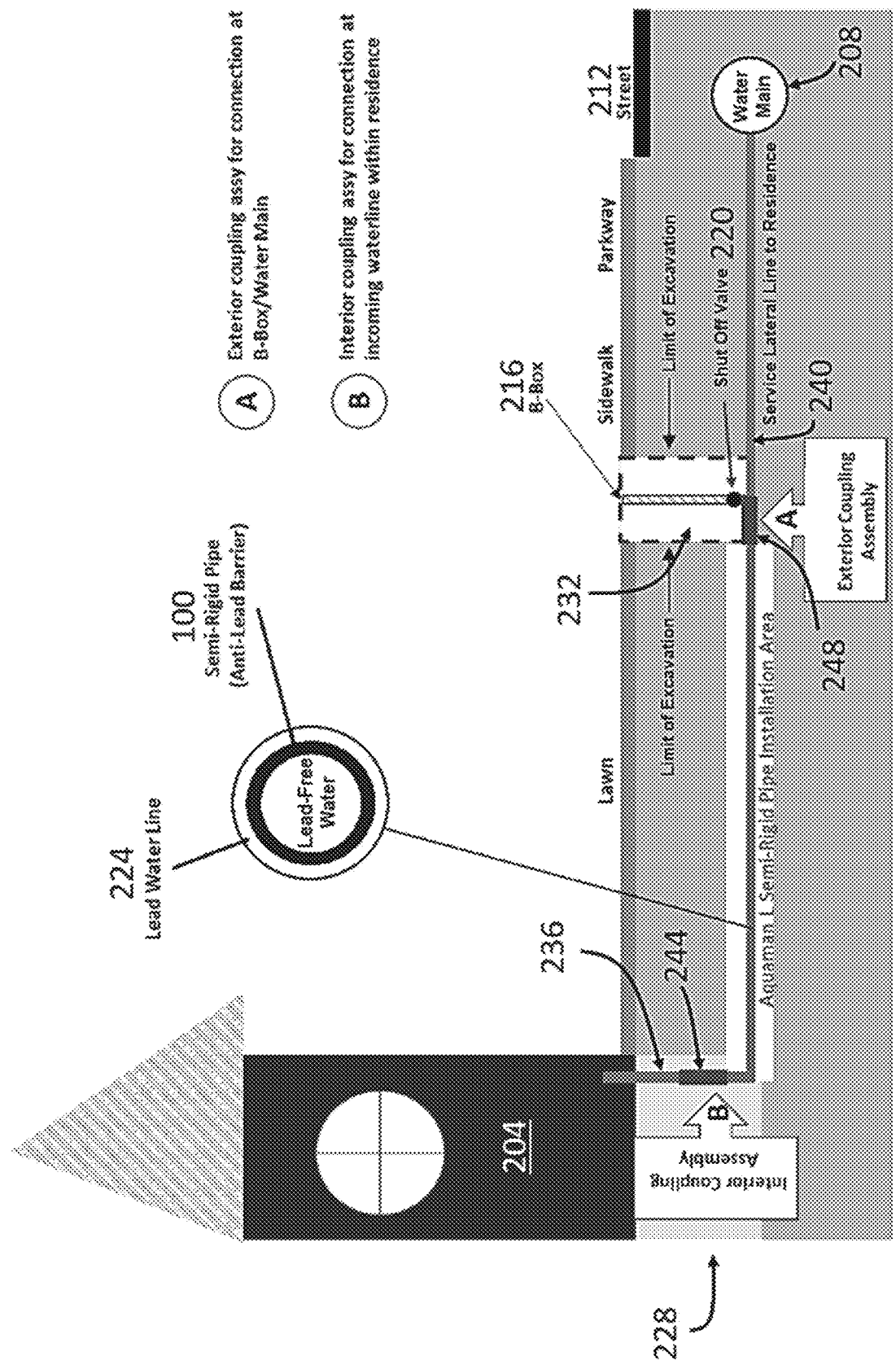
FIG. 2 depicts a cross-sectional view of a remediated site in accordance with one or more aspects of the invention.

FIG. 2 provides a cross-sectional view of a remediated site. A house 204 receives water from the water main 208 buried below the street 212. A b-box 216 provides access to a water shutoff valve 220. Prior to remediation, water flowed into the house 204 through a lead water line (pipe) 224. During the remediation process according to one or more aspects of the present disclosure, a semi-rigid pipe 100 has been inserted inside the water line 224. The semi-rigid pipe 100 serves as a barrier between the water line 224 and the water that flows into the plumbing system 228 of the house 204. Unlike the remove-and-replace method of remediation, which requires excavation at least from the b-box 216 to the basement 228, the excavation 232 needed to perform the remediation of the present disclosure is only the much smaller area immediately around the b-box 216. Further, the remove-and-replace method of remediation requires removing the existing pipe 224 through the basement foundation and inserting a new water line with the possibility of damage to the foundation. The semi-rigid pipe 100 is connected to the existing water pipes 236, 240 in the house 204 and at the b-box 212 with an interior coupling assembly (ICA) 244 and an exterior coupling assembly (ECA) 248, respectively. Both coupling assemblies, interior 244 and exterior 248 can function at either end of the semi-rigid pipe 100. However, the two coupling assemblies 244, 248 can differ in how they connect (couple) to existing water pipes. The interior coupling assembly 244 can connect directly to the water meter without an intermediate section of pipe to reduce the opportunity for a consumer to bypass the water meter. Coupling assemblies will be discussed in greater detail below.

While FIG. 2 depicts an system that connects a b-box 216 to a consumer's interior water system 228, the present invention also provides systems that connect other plumbing. For example, a system similar to the one depicted in FIG. 2 can be installed from a b-box 216 to a water main 208.

For example, a supersystem can include a plurality of systems with adjacent systems disposed on either side of existing plumbing and where the supersystem is configured to allow fluid flow from a first end of the supersystem to a second end of the supersystem. As an example, a supersystem can include a b-box 216 between a first and a second system.

Figure 3:
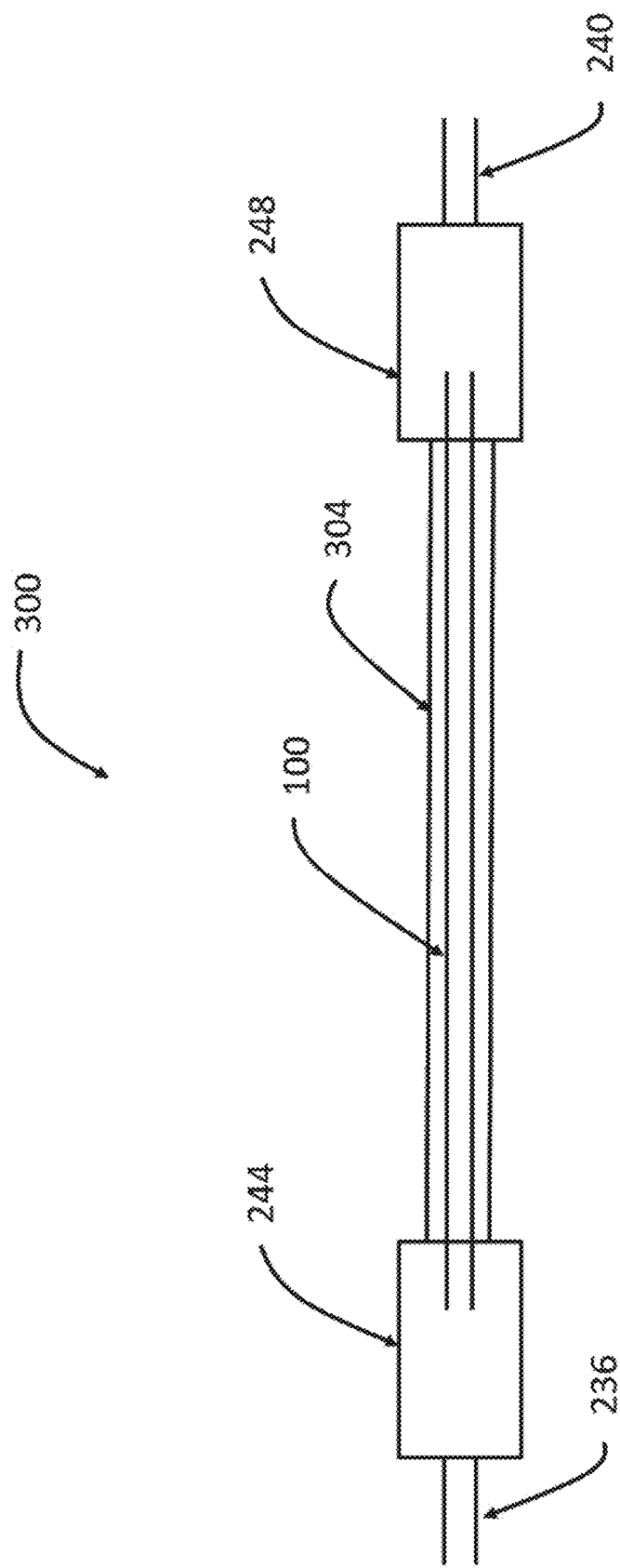
FIG. 3 depicts a simplified cross-sectional view of a system in place in accordance with one or more aspects of the invention.

A simplified cross-sectional view of the system 300 according to one or more aspects is depicted in FIG. 3. The system 300 includes a semi-rigid pipe 100 inserted in a first existing pipe 304, for example a lead pipe 224 between a b-box and a house. Coupling assemblies 244, 248 provide a leak-free, fluid-tight seal between the semi-rigid pipe 100 and existing pipes 236, 240. The semi-rigid pipe 100 extends into each coupling assembly 236, 240 to a greater degree than the first existing pipe 304 does. The coupling assemblies 244, 248 can be the same or different. As an example, the existing pipes 236, 240 to which the coupling assemblies 244, 249 connect can require a flare fitting, an NPT threaded fitting, or some other type. Wither type of coupling assembly can occur at either end of the system 300.

FIG. 4A presents an aspect of a coupling assembly 248 and sleeve 404 that couples a semi-rigid pipe 100 to an existing pipe 240. The coupling assembly 248 includes a coupling 408 with a nipple (not visible) that the semi-rigid pipe 100 slides over, a compression nut 416 that fits over the semi-rigid pipe 100 and threads onto the coupling 408, pressing the semi-rigid pipe 100 against the nipple to form a leak-free, fluid-tight fit. The opposite end of the coupling 408 is threaded to connect with an existing pipe 240. In the aspect shown in FIG. 4A, the coupling 408 has a taper at the opposite end to mate and seal with a flared end of existing pipe 240. A flare nut 412 fits over the existing pipe 240 and threads onto the coupling 408 to form a leak-free, fluid-tight fit between the coupling 408 and the existing pipe 240 when the proximal end of the existing pipe 240 is flared. In locations where it would be challenging to bypass the water meter, for example at the b-box, this aspect can be used. FIG. 4A shows a mock-up of a b-box where a shut-off valve 220 is located. The sleeve 404 can be configured to clamp at one end onto the unthreaded end of the compression nut 416 and at the other end to clamp onto the pipe 304. The sleeve can be made of two half-shells that can be fastened together, for example, by bolts 420. As the fasteners are tightened, the sleeve 404 clamps onto the compression nut 412 and the pipe 304. FIG. 4B provides an enlarged view of a portion of FIG. 4A.

FIG. 4C provides a view of the coupling assembly 248 of FIGS. 4A and 4B with a second sleeve 424 that uses 8 bolts 428 for clamping rather than the four bolts 420 used with sleeve 404.

Figure 4D:
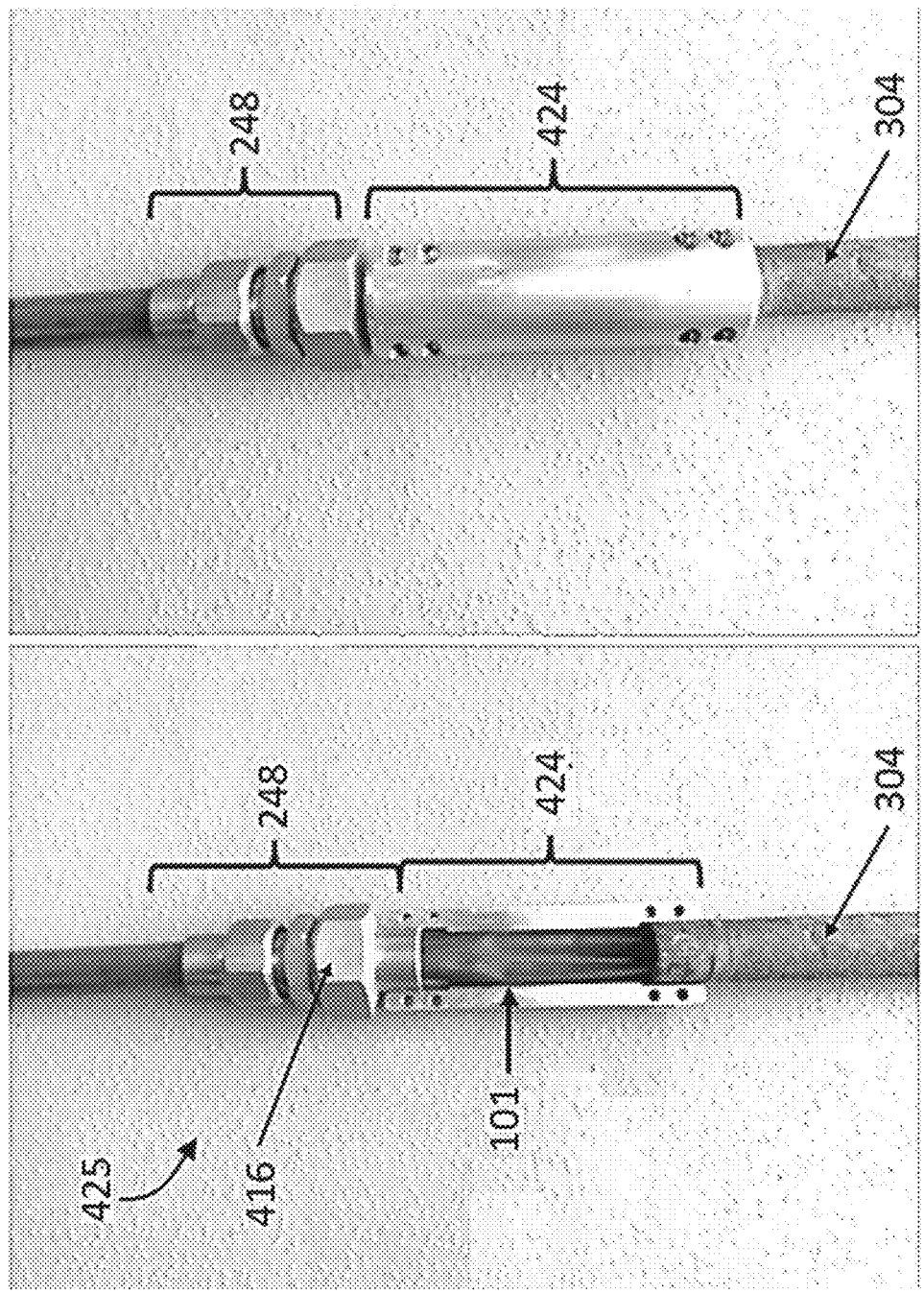

FIG. 4D provides the view of the coupling assembly 248 along with both the second sleeve 424 and an open view 425 of the second sleeve. In the open view, one can see that the sleeve 424 receives the lead pipe (that is, whatever pipe is being bypassed) 304 and the coupling 416 up to the point where shoulders 427, 429 stop further insertion of either the pipe 304 or the coupling 416. In one or more aspects, the semi-rigid pipe can be an Aquaman L semi-rigid pipe 101. However, semi-rigid pipes are more broadly considered as applicable. The sleeve of the present aspect is seen to be two half-shells that can be fastened together with screws, bolts, clamps, or other suitable means. Bringing the sleeve halves together secures both the coupling assembly 248 (specifically, coupler 416) and lead pipe (or other existing pipe to be bypassed) 304 in place.

Figure 5A:
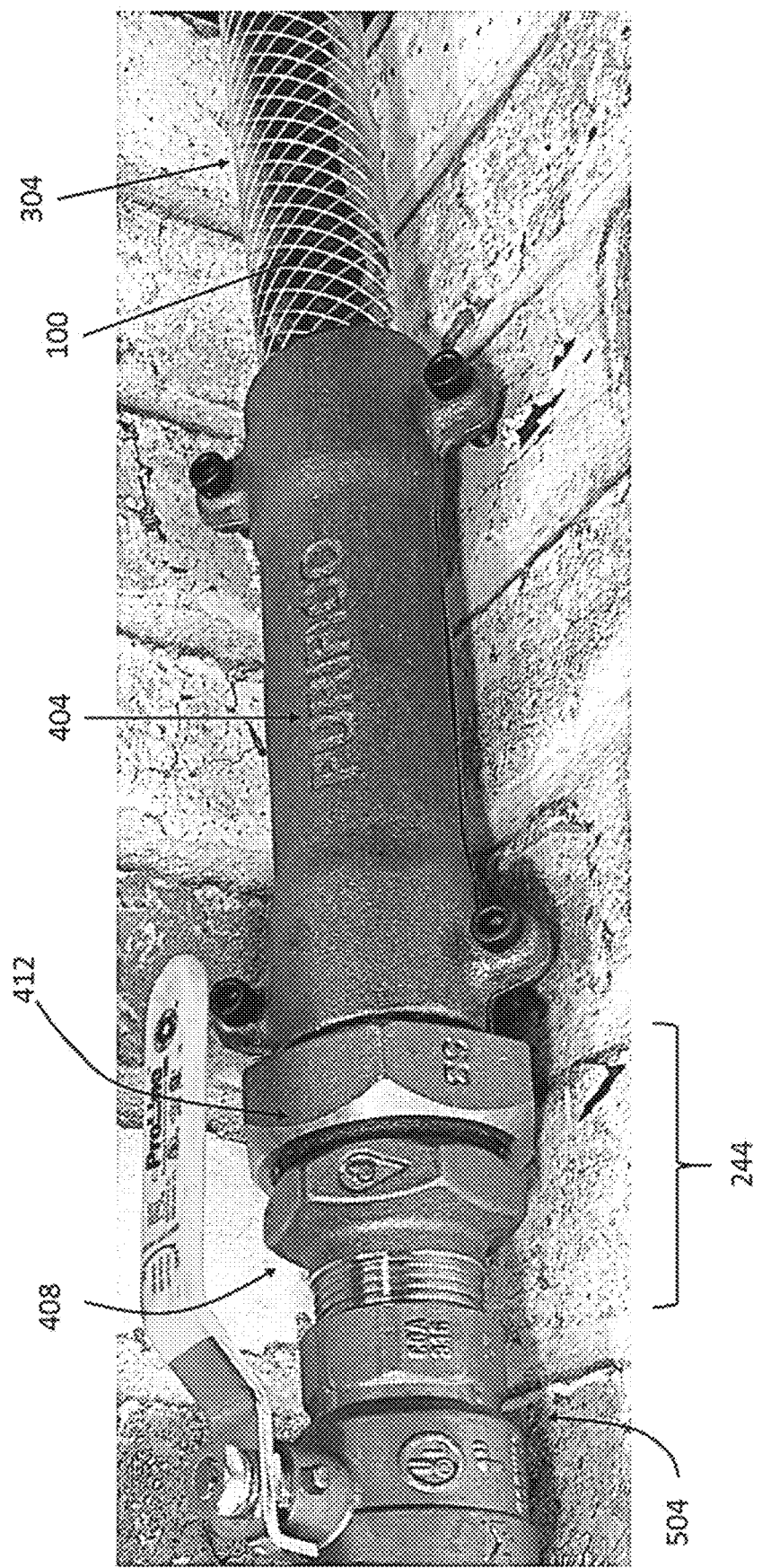
FIG. 5A depicts another coupling assembly and sleeve in accordance with one or more aspects of the invention.

FIG. 5A depicts a coupling assembly 244 and sleeve 404 that can be used outside the home or, commonly, inside a home, depending on the type of existing pipe with which the coupling assembly 244 is connecting. Features that are the same as one or more previously presented coupling assemblies and sleeves will not be repeated here. Coupling assembly 244 differs from coupling assemblies above because coupling assembly 244 does not use a flare nut. Instead, coupling 408 threads directly into a water meter, valve 504, or the like. These threads can be to National Pipe Thread (NPT) standards. In one or more aspects, the coupling assembly 244 shown in FIG. 5A can be an interior coupling assembly. As stated previously, there are no fundamental reasons that various coupling assemblies could not be used in more than one type of location. For preventing the bypassing of a water meter, however, the coupling assembly presented in FIG. 5A can be more useful.

The coupling assembly includes at least a coupling and a compression nut. In some coupling assemblies, a flare nut can also be introduced.

In the present disclosure, proximal and distal, especially proximal and distal ends of parts are used to provide orientation of the parts with respect to the semi-rigid pipe. For example, the proximal end of a part is configured to be closer to the semi-rigid pipe that the distal end is.

Figure 5B:
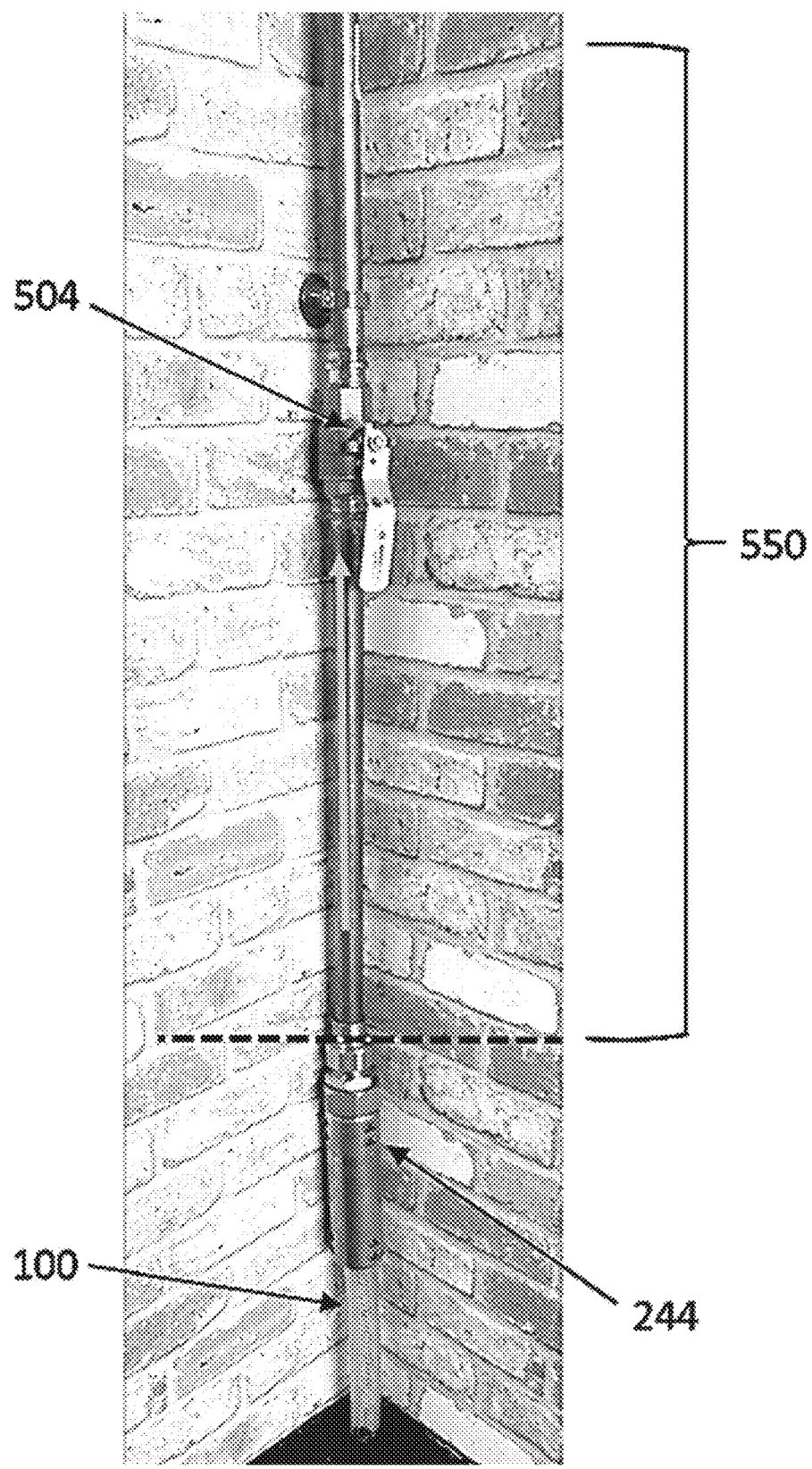
FIG. 5B depicts interior connections in accordance with one or more aspects of the invention.

FIG. 5B depicts a portion of a system located in a residence, perhaps in a basement. In the example presented here, a semi-rigid pipe 100 running from outside the residence, for example, from a b-box, enters through the floor of the basement and couples via an interior coupling assembly 244 to a residential interior distribution line 550. The residential interior distribution line 550 can include a water supply valve 504. Water flows through the system from bottom to top as indicated by the arrow.

Referring to FIG. 6A, a coupling 408 is presented in perspective view. The coupling proximal end 604 includes a nipple 608 configured to fit snugly into the semi-rigid pipe 100 with a friction-tight fit. The outer surface of the nipple 608 can be a smooth cylinder. As used herein, the terms "smooth" and "smoothly" refer to surfaces being designed and manufactured to be essentially constant or monotonically varying as a function of position along the part. The nipple has an outer diameter 609 and an inner diameter 610 as seen in FIGS. 6B and 6D, respectively. In other aspects of the invention, the outer surface of the nipple cannot be smooth. The outer surface of the nipple can be etched, barbed, or otherwise prepared in a fashion that is not smooth as defined herein. Adjacent to and at the distal end of the nipple 608 is an external thread 612 that has a diameter greater than the outer diameter of the semi-rigid pipe 100. The external thread 612 is configured to receive an internal thread on the distal end of a compression nut 416.

A distal end 616 of the coupling 408 is disposed opposite the coupling proximal end 604 and has an inner diameter 618. The distal end includes external threads 620 for producing a secure, leak-free, fluid-tight connection with a pipe or a plumbing fixture such as a water meter or valve. In one or more aspects, the distal end 616 of the coupling 408 further includes a surface 624 shaped to mate with and form a fluid-tight connection with a pipe with a flared end.

Still referring to FIGS. 6A-6D, an intermediary section 628 is disposed between the external threads 612, 620 and is configured to allow the coupling 408 to be held securely and threaded securely. The aspect pictured is configured to be held by a wrench. In one or more aspects, the outer surface of the intermediary section 628 can be knurled or provided with any other surface that would allow the threading and unthreading of the coupling 408 with other parts of the coupling assembly.

Referring to FIG. 7A, a compression nut 416 includes a distal end 704 with internal threads 708 configured to mate with the external threads 612 on the proximal end of the coupling 408. The compression nut distal end 704 includes an outer surface 710 configured to be held securely to allow the compression nut 416 to thread over the coupling 408. The compression nut proximal end 712 is disposed opposite the compression nut distal end 704.

The inner surface 716 of the compression nut 416 tapers inward from the compression nut distal end (the threaded end in FIG. 7D) 704 to the compression nut proximal end 712 such that threading the compression nut 416 onto the coupling 408 presses the semi-rigid pipe 100 against the nipple 608 to form a fluid-tight seal. The taper can occur smoothly from between the two ends 704, 712 of the compression nut 416, although other tapers can be used that would also cause a fluid-tight seal between the semi-rigid pipe 100 and the nipple 608 to be formed.

The proximal end 712 of the compression nut 416 comprises a cylindrical outer surface 720 with an outer diameter 724 and an inner diameter 728 as seen in FIGS. 7B and 7D, respectively. The outer surface 720 can be clamped by a sleeve.

In one or more aspects, the coupling assembly further includes a flare nut 412. Referring to FIGS. 8A-8D, a flare nut 412 can include a proximal end 804 with an internal thread 808 configured to mate with the external thread 620 on the distal end 616 of the coupling 408 and sealingly connect a flared proximal end of an existing pipe 240 to the distal end 616 of the coupling 408. The outer surface 812 of the proximal end 804 of the flare nut 412 is configured to be held securely to facilitate threading the flare nut 412 onto the coupling 408. The distal end 816 of the flare nut 412 has an inner diameter 820 that allows the flare nut 412 to slide onto the existing pipe 240 before flaring the pipe end but not after. The outer diameter 824 of the distal end 816 of the flare nut 412 is shown in FIG. 8B.

Figures 9A, 9B:
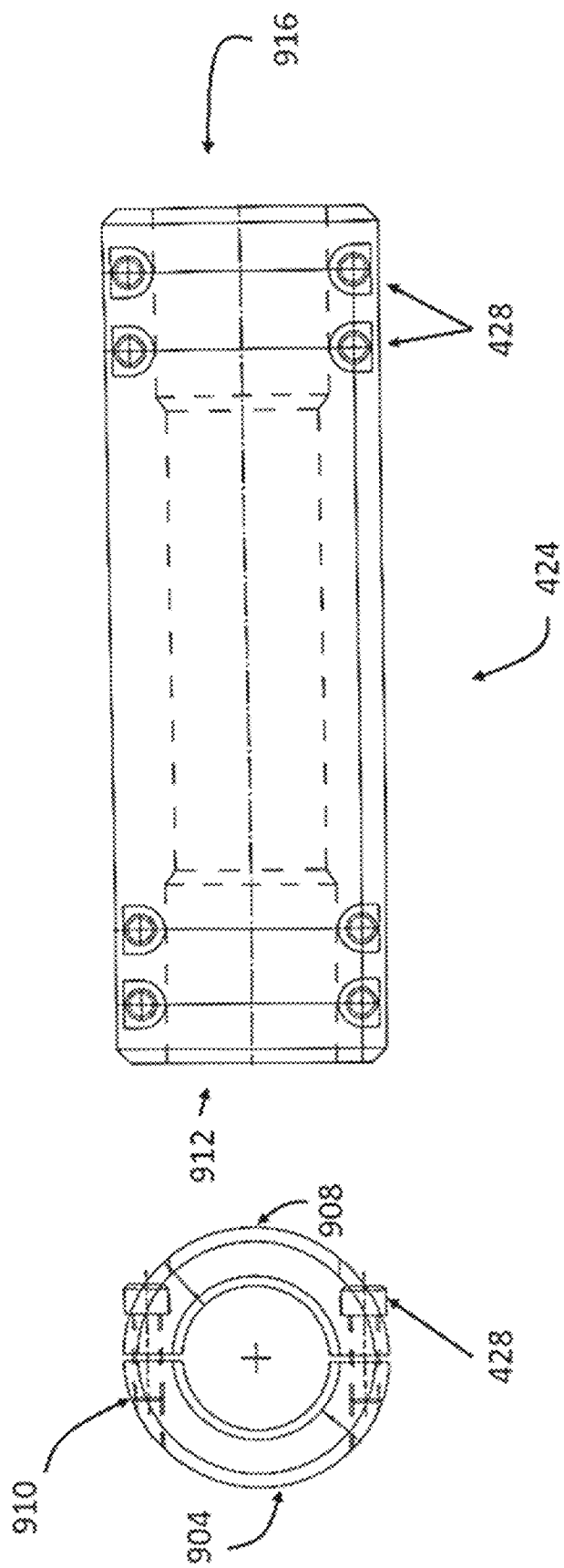
FIGS. 9A and 9B depict a sleeve in plan and end views, respectively, in accordance with one or more aspects of the invention.
Figure 11D:
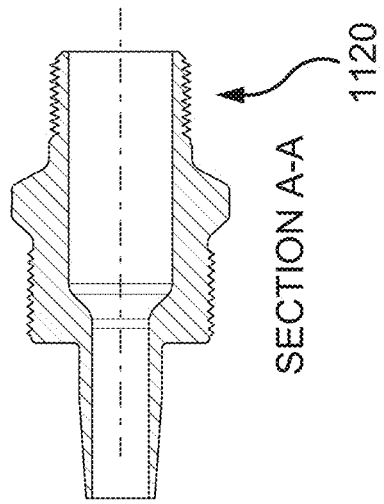
FIGS. 11A-11D depict a third coupling, with an NPT thread, in perspective, side, end, and cross-sectional views, respectively, in accordance with one or more aspects of the invention.
Figure 11C:
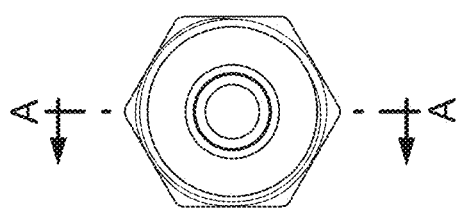
Figure 11A:
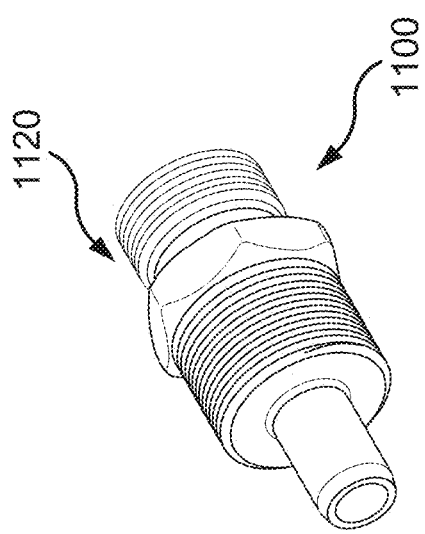
Figure 11B:
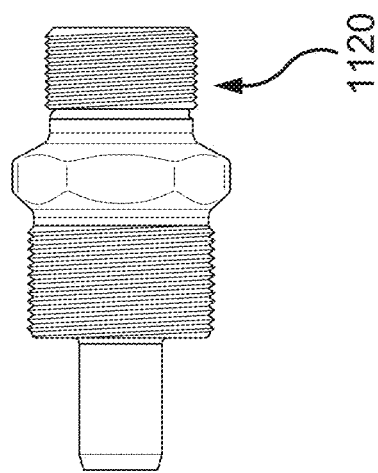

FIGS. 9A and 9B provide plan and end views, respectively, of an aspect of a sleeve 424. The sleeve 424 includes a plurality of shell sections 904, 908. These shell sections 904, 908 can be fastened together with, for example, a plurality of bolts 428 inserted in respective holes 910, that allow a first sleeve end 912 to receive and securely clamp over an existing pipe (for example, a lead pipe 304) through which the semi-rigid pipe 100 can be inserted and a second sleeve end 916 to receive and securely clamp over the proximal end 712 of a compression nut 416. The inner dimensions of the sleeve 424 can be such that the pipe and the compression nut 416 can be limited as to the extent of their insertion into the sleeve, while the sleeve 424 is configured to allow the semi-rigid pipe 100 to pass through from the first to the second sleeve end.

FIGS. 10A-10D depict a second coupling 1000 with many similarities to those previously described and which will not be repeated here. One distinguishing feature is that external thread 1012 is longer in the axial direction of the coupling 1000 than external thread 608. Various lengths of external thread can be used without departing from the contemplated coupling.

A second distinguishing feature is that nipple 1008 is tapered outer surface moving from the external threads 1012 toward the free end of the nipple 1008. This taper angle 1077 is depicted in FIG. 10D. The taper angle can be any angle greater than 0° and less than 180°. In one aspect, the taper angle is between 90 and 120°. In another aspect, the taper angle is between 90 and 100°. In yet another aspect, the angle is between 90 and 95°. In another aspect, the taper angle is 91°.

FIGS. 11A-11D depict a third coupling 1100 with many similarities to the first coupling and particularly to the second coupling 1000 discussed in relation to FIGS. 10A-10D. One difference is that the third coupling 1100 is not designed for coupling with a flared pipe because it lacks the coupling surface shown with 624 and 1024. Instead, the external threads 1120 on the distal end of the coupling 1100 extend to the distal end of the coupling. The third coupling 1100 also includes a tapered nipple as described in regard to the second coupling 1000. The external threads 1120 on the distal end of the coupling 1100 can be National Pipe Thread (NPT) threads.

FIGS. 12A-12D depict a second compression nut 1200. The second compression nut 1200 is similar in many ways to the compression nut discussed above in relation to FIGS. 7A-7D. Similar features will not be repeated. A difference between the compression nuts is that the second compression nut 1200 includes an outer surface 1210 that is longer in the axial direction than outer surface 710 of the first compression nut. Additionally, internal threads 1208 also cover a greater extent in the axial direction than do internal threads 708. In one or more aspects, the internal threads 1208 can extend as close as possible to the proximal end of the second compression nut 1200.

Another difference is that the second compression nut (or adapter) 1200 includes a tapered inner surface 1216. The angle 1217 of the taper is 90° less than the taper angle 1077. Thus if taper angle 1077 of the coupling is 91°, taper angle 1217 is 1°. Thus, when the second compression nut 1200 is threaded on a coupler with a tapered nipple, the tapered nipple surface and the tapered inner surface 1216 will maintain equal separation between them that decreases as the second compression nut 1200 is threaded on the coupler, compressing the semi-rigid pipe between the two surfaces to form a water-tight (or liquid-tight) seal. This angular relationship of the tapered parts allows differences in the semi-rigid pipe, such as differences in wall thickness, perhaps due to manufacturing tolerances, to be compensated without compromising the quality of the seal formed between the semi-rigid pipe and the coupling.

FIGS. 13A-13D depict another sleeve 1300. The sleeve includes a first end section 1310, a second end section 1320 opposite the first end section 1310, and a middle section 1330 disposed between the first and second end sections 1310, 1320. The end sections 1310, 1320 taper to a narrower middle section 1330. Only the semi-rigid pipe passes through the middle section 1330. The first end section 1310 attaches over the pipe being bypassed (e.g., the lead pipe) while the second end section 1320 attaches to the coupling. The sleeve 1300 comprises two half-shells that are fastened to each other using fasteners, for example, bolts that pass through the holes 1340. Other forms of fasteners such as clips, adhesives, wrapping in wire, and the like can also be used.

Figure 14:
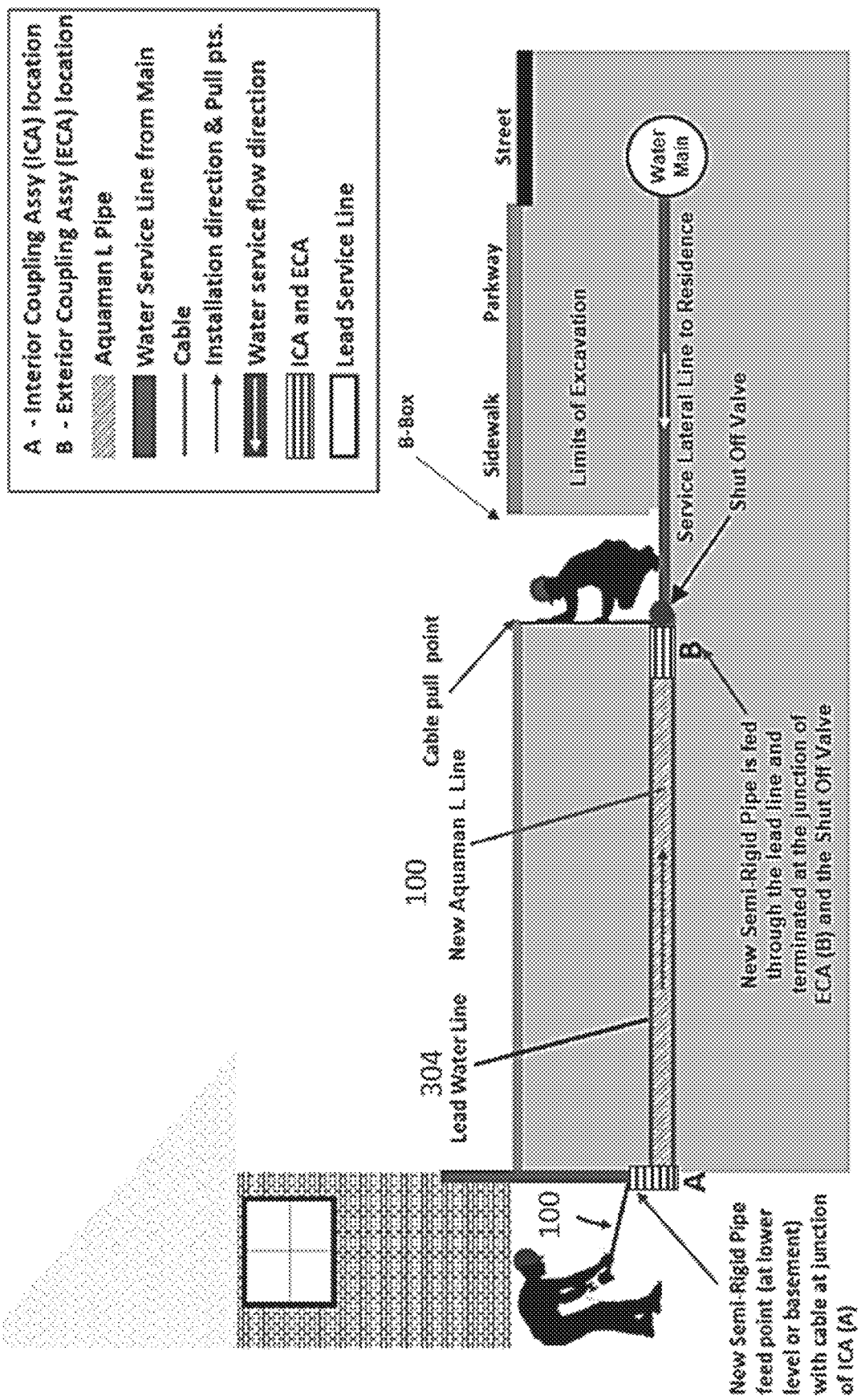
FIG. 14 depicts an installation process in accordance with one or more aspects of the invention.

FIG. 14 depicts an installation process at a location with features previously identified in FIG. 2 that will not be repeated here. FIG. 14 illustrates a semi-rigid pipe 100 being fed through an existing pipe 304 (for example a buried lead water line) that runs between a house or other structure and a water shutoff valve in a b-box. As illustrated here, the semi-rigid pipe 100 is being fed from the house to the b-box. Practical concerns can determine the direction of feeding the semi-rigid pipe 100, though no fundamental reason precludes feeding in either direction.

Figure 15A:
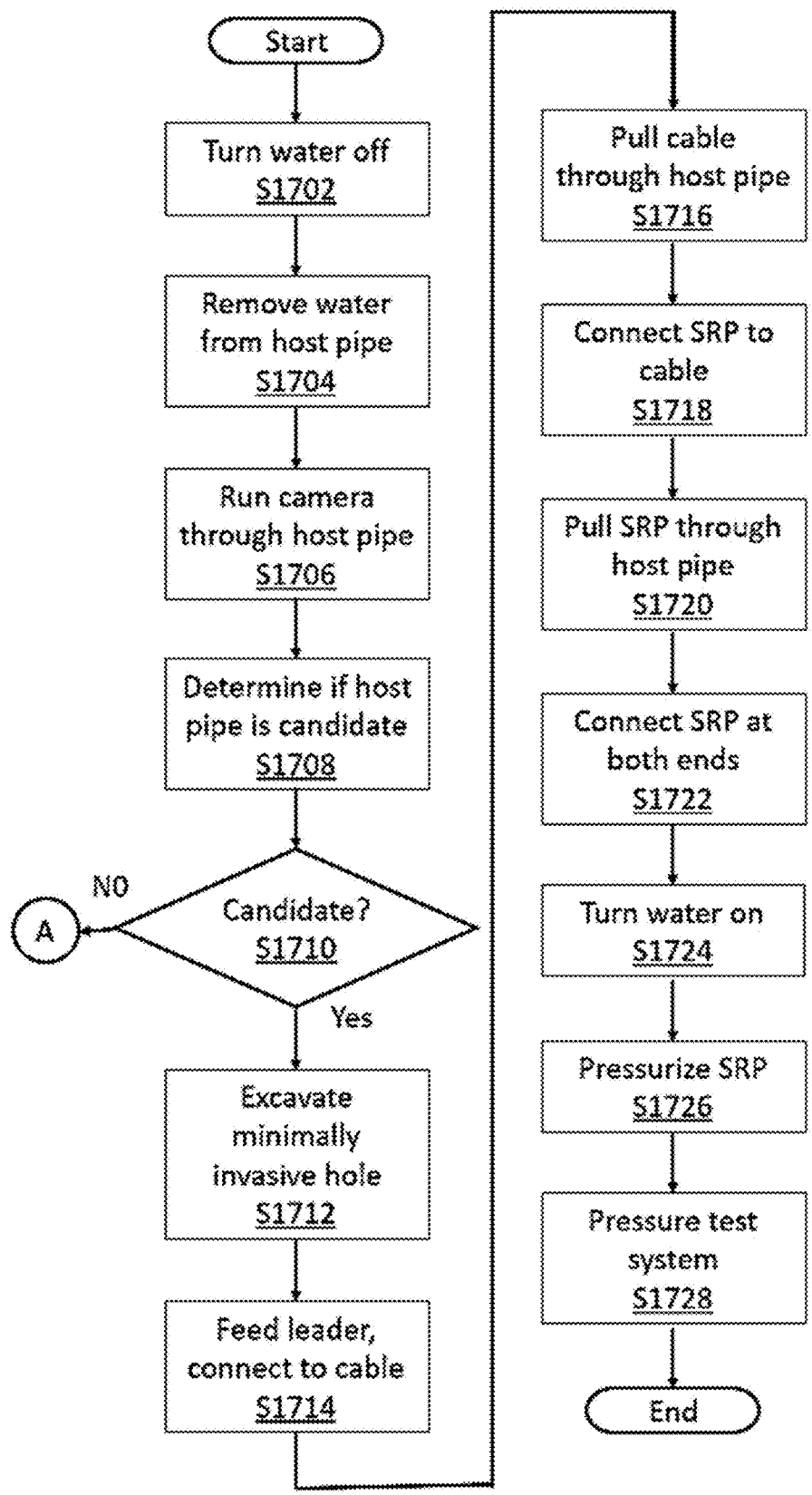
FIGS. 15A and 15B are flowcharts of a method of installation in accordance with one or more aspects of the invention.

FIG. 15A presents a flowchart that outlines one or more aspects of a method to install a system described herein that can be used, for example, for remediation of contaminated drinking water.

Water is turned off at the b-box, which supplies water from the water main, and at the residence (or other type of building) S1502. The current coupling in the basement between existing plumbing in the residence and the buried lead water line is disconnected. This existing pipe that runs between the residence and the b-box can also be referred to as the host pipe. Water can be sucked out of the host pipe from the residence side (e.g., the basement side) S1504. A wet-dry vacuum can be used for this purpose.

A camera can be run through the host pipe S1506 to determine if the host pipe is a candidate for restoration with a semi-rigid pipe S1508. If the host pipe is not a candidate S1510, safely and securely reconnect water service S1550 and fill any hole that can have been created S1552. Other means of remediating lead pipe contamination of household (drinking) water must be used.

If the host pipe is a candidate, then the process can proceed as follows. A minimally invasive access hole, for example, approximately 5 ft by 5 ft, is excavated at the b-box, and the access hole is shored up to secure entry S1512. If the remediation process occurs at some later time, the water, which will have been reconnected after the initial determination, must be again disconnected at the residence and at the b-box.

A leader is fed through the pipe to be remediated from the house to the b-box, where the leader is connected to a wire cable S1514. Using the leader, the wire cable is pulled through to the house S1516. In the house, the semi-rigid pipe is connected to the wire cable S1518. The wire cable and the semi-rigid pipe (with lubricant on it) are both pulled through the host pipe, that is, the pipe to be remediated S1520. The wire cable and semi-rigid pipe can be pulled manually or with equipment (e.g., a winch).

Connect the semi-rigid pipe to the water meter in the residence and at the b-box end S1522. In some cases, a pipe, for example a copper pipe, can be installed at the b-box in order to connect the semi-rigid pipe at the b-box end. Details of connecting are presented below.

Once the connections have been made, the water is turned back on S1524. The semi-rigid pipe is pressurized and the wrap 130 around the semi-rigid pipe that keeps the semi-rigid pipe in a U-shape during insertion into the remediated pipe is burst, allowing the semi-rigid pipe to expand to fill the remediated pipe S1526. The system can then be pressured tested S1528, and the minimally-invasive hole filled S1530.

Figures 15A, 15B:
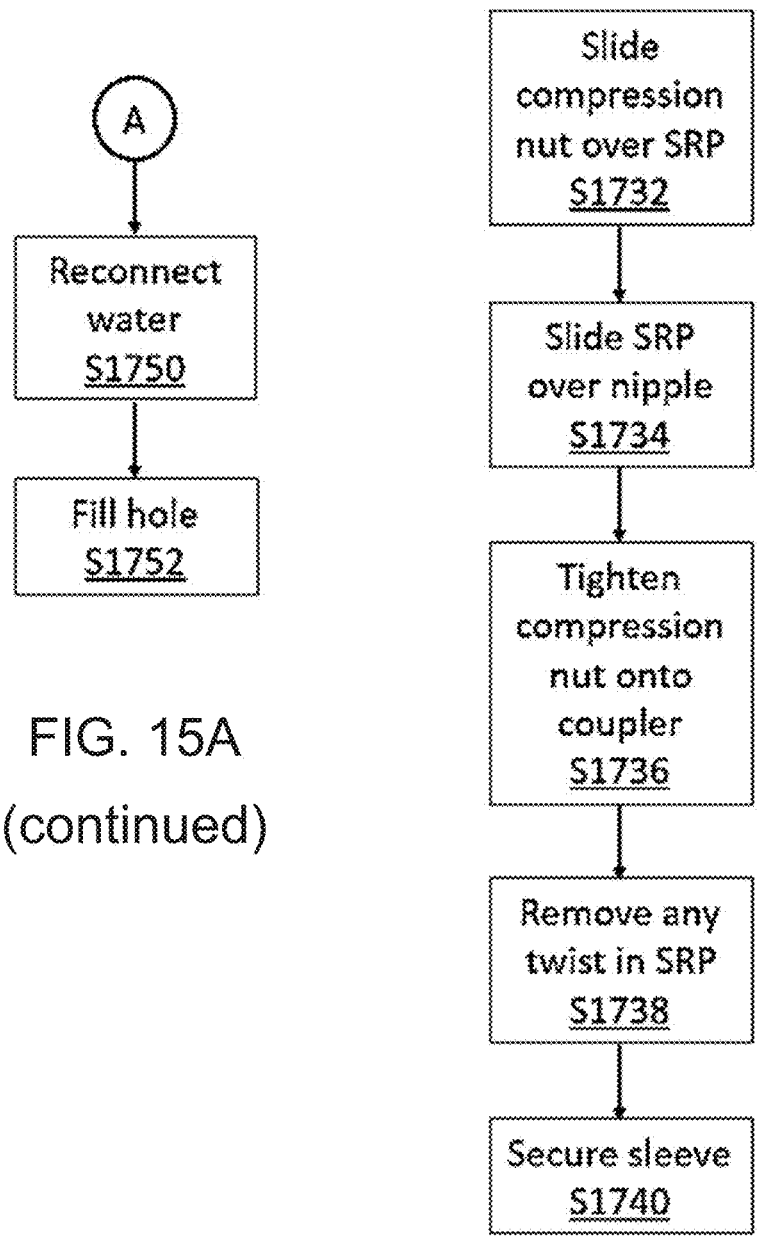

As outlined in the flowchart in FIG. 15B, connecting the semi-rigid pipe to the water meter (or other plumbing) in the house and to the b-box (or a pipe attached to the b-box) includes sliding a compression nut over the semi-rigid pipe S1532. The semi-rigid pipe is slid over the nipple of the coupling S1534. Tighten the compression nut onto the external threads near the proximal end of the coupling S1536 while making sure that the semi-rigid pipe is not being twisted 51538. Secure the sleeve from the compression nut to the remediated pipe S1540.

At the installer's discretion, place a compression or flare nut over the pipe (for example, at the b-box). If a flare nut is being used, flare the pipe over which the flare nut is placed. Couple the pipe to the coupling by tightening the nut onto the coupling.

The coupling, compression nut, flare nut, and sleeve can comprise metal (brass, steel, stainless steel, copper, aluminum, and the like), plastic, other materials suitable for plumbing, or any combination thereof.

While the present disclosure has used as a non-limiting example a municipal water system that supplies water to a house through a lead pipe, the disclosure can be made to apply to locations other than municipalities, fluids other than water, fluid conduits other than lead pipes, and consumers other than residential and commercial structures.

Moreover, any combination of the above-described elements in all possible variations thereof is encompassed by the invention unless otherwise indicated herein or otherwise clearly contradicted by context.

Technical Data, Specification, and Installation Procedures

One or more aspects of the present disclosure can improve public safety and provide environmental safeguards for trenchless technology applications, for example, addressing the presence of lead in drinking water. Aspects can allow for a robust rehabilitation of the water main lateral lines, from the b-box, normally located between the curb line and sidewalk line, to entry point of the residence. Excavation can be limited to the b-box with no other deconstruction of the property or the premises required. The semi-rigid pipe is pulled thru the existing lead pipe, with coupling assemblies installed on both ends of the lead pipe to complete the system in a fraction of the time, and at a fraction of the cost, of antiquated dig-and-replace activities for lead pipe remediation.

One or more aspects of the present disclosure can provide a unilateral solution for restoring clean water services to all communities, regardless of size or location. These one or more aspects of the present disclosure can provide a safer, expedited method of restoring clean water services at a fraction of the high cost of removing and replacing water lines to homes. Thus, more communities are enabled to restore these critical water assets.

Homeowner and local business property are protected during installation, with minimal ground disturbance. Interruptions to neighborhood vehicle and foot traffic is equally diminished, with an installation production rate that is 5 to 10 times greater than the production rate of remove and replace methods.

Technical Data Sheet
Product Data for Coupling Assemblies

The system coupling assemblies are an engineered design, comprised of an Exterior Coupling Assembly (ECA) and an Interior Coupling Assembly (ICA). The assemblies are certified to NSF/ANSI 372 and are in conformance with the lead content requirements for lead-free plumbing as defined in the U.S. Safe Drinking Water Act.

As illustrated in this document, the ECA can be a brass connection assembly that is mechanically attached to the incoming water service line at the B-Box and links the water service line from the water main to the semi-rigid pipe (SRP).

Identical to the ECA, the ICA is mechanically attached to the semi-rigid pipe and is linked with the interior water service line located within the residence. The detailed mechanical properties of the fittings for the coupling assemblies are provided in the NSF-61 approval section of the present disclosure. The brass fittings can provide a high level of integrity of the joints and enable an uncompromised connection to the SRP.

The four-piece coupling assemblies can be comprised of three fittings and one sleeve. A non-limiting example of a coupling assembly is presented in FIG. 4D. In one or more aspects of the present disclosure, the sleeve cannot be present.

Technical Data Sheet
System Interior Connections
NSF-61 Approval—Coupling Assemblies Table 1 reproduces a list of products conforming to the requirements of NSF/ANSI/CAN 61—Drinking Water System Components—Health Effects as recorded Jun. 21, 2022. In the table, the products are certified to NSF/ANSI 372 and conform with the lead content requirements for "lead free" plumbing as defined by California, Vermont, Maryland, and Louisiana state laws and the United States Safe Drinking Water Act. In addition to the mechanical devices included in Table 1, a water coupling and a meter flange where the water contact material is iron and sized between ½ and 3 inches can be used. Further, plumbing of other dimensions can be used, with the disclosed systems, methods, and assemblies, which can be manufactured, installed, and used with any suitable dimensions.

In the table, C represents copper solder joint, CF copper x female thread, CM copper x male thread, EH extra heavy, LF lead free, and XXXX denotes 4 numeric characters representing size. All low lead, lead-free part numbers carry the LF suffix. The term "D. Hot" refers to domestic hot water, defined to be 60° C. (140° F.).

TABLE 1

| | Mechanical Devices | | | |
|---|---|---|---|---|
| Trade Designation | Size (inches) | | Water Contact Temperature | Water Contact Material |
| Water Meters | Minimum | Maximum | | |
| Water Coupling 60185 XXXX LF | ½ | 2 | D. Hot | Brass |
| Meter Flange 60186 XXXX LF | ½ | 2 | D. Hot | Brass |

In one or more aspects of the present disclosure, the semi-rigid pipe can have a tested burst pressure greater than 500 pounds per square inch (psi). Unlike cured-in-place pipe methods, the semi-rigid pipe can be installed without the use of epoxies, heat, or steam, in the curing process.

The semi-rigid pipe can be cable-pulled or winched into the host water line (that is, the water line to be bypassed such as a lead pipe). The semi-rigid pipe can be pre-formed, U-shaped, and banded with an outer protective tape layer, allowing for multiple bends and turns in the water line route, as necessary. The end of the semi-rigid pipe can be securely closed during installation, eliminating the potential for lead or other contaminant to enter the new pipe.

The connection of the semi-rigid pipe to system's end couplings and hardware assemblies is made at the b-box, which can be located between the curb line and the sidewalk of the residence. The new water line can then be pressurized, enabling the U-shaped pipe to open and expand to the inner diameter of the original pipe (for example, lead pipe), while maintaining the required design pressure of the host pipe. The completed rehabilitation can result in a new water service line with no annular space between the new service line and the former. The new service line will have a lower friction value (Manning "N" value), creating a smoother conduit for the conveyance of water.

In one or more aspects, the semi-rigid pipe have the characteristics in Tables 2-4. Table 2 contains the information from the NSF/ANSI/CAN 61 listing for Drinking Water System Components—Health Effects. Both entries are certified for the equivalent metric sized of 19.0 mm-304.8 mm. The water contact temperature code CLD indicates testing was done with cold water at 23±2° C. The water contact material code PUR indicates polyurethane.

TABLE 2

Pipes and Related Products

| Trade Designation | Size (inches) | | Water Contact Temperature | Water Contact Material |
|---|---|---|---|---|
| Tubing/Hose | Minimum | Maximum | | |
| Mandals Aquaman | ¾ | 12 | CLD 23 | PUR |
| Mandals Wellman | 1 | 12 | CLD 23 | PUR |

TABLE 3

Semi-rigid pipe properties

| Nominal Pipe Diameter | | Actual Pipe Diameter | | Wall Thickness | | Unit Weight | |
|---|---|---|---|---|---|---|---|
| Inch | mm | Inch | mm | Inch | mm | lbs/ft | kg/m |
| 3/4 | 19 | 0.78 + 0.02 | 19.8 + 0.5 | 0.047 + 0.006 | 1.20 + 0.15 | 0.056 | 0.084 |

TABLE 4

Additional properties of semi-rigid pipe

| Burst Pressure (ISO 1402) | | Outside Diameter at 73 psi (5 bar) | | Tensile Strength | TPU Adhesion (ISO 8033) |
|---|---|---|---|---|---|
| psi | bar | Inch | mm | lbs × 1000 Tons | KN/m |
| 650 | 45 | ≥0.984 | ≥25 | 2.2    1.0 | ≥3 |

Product Installation

The installation procedures below provide a step-by-step process following the excavation of soil encasing the b-box. The three-stage process comprises:
  Water Service Line Preparation and Inspection Stage
  Installation Stage
  Post-Installation Stage Water Service Line Preparation and Inspection Stage Prior to the removal of any component of the water service line, the b-box valve is turned to the off position, cutting off flow from the water main. The incoming waterline valve inside the residence or building is also turned to the off position. The existing line couplings/fittings are removed at both the junction of the b-box and the incoming water supply source inside the residence or building.

Using a cable-fed CCTV micro-camera unit, the entire length of the water service line (that is, the pipe to be bypassed, for example, the lead pipe) can be video recorded. The results can be inspected to assess the condition of the lead pipe, with specific attention to any bends, kinks, pinch points, or other obstructions that would prevent rehabilitation. In the event the line is determined to be a viable candidate for rehabilitation, the installation process begins.

Conversely, in the event the lead pipe is determined to be beyond rehabilitation, the line can be tagged for removal and replacement. The original couplings can be reinstalled, and water flow can be re-established at the b-box valve and end/internal source. The water service inside the residence or business should be turned on and run continuously for one-half hour prior to using to allow for the removal of any trace lead that can be present.

Product Installation (Cont.)

Installation Stage

Removal of Original Connection Fittings

Following the removal of the existing line couplings/fittings at both the junction of the b-box and the incoming water supply source inside the residence or building, trace elements of lead, in the form of dust, particles, and detached material should be removed. It is recommended that vacuuming be performed at the open ends of the existing line, removing any trace of lead.

Replacement Pipe Installation

Using a cut-to-length section of semi-rigid pipe (SRP), a steel cable (for example, ⅛ inch-¼ inch diameter) can be attached to the interior end of the SRP within the residence or building. The spooled SRP is folded laterally in a U-shape as shown in FIG. 1B, to allow for an unobstructed installation through the existing lead pipe. The SRP can then be hand-pulled or winched at the b-box, pulling the new pipe in the direction of the water main, ending at the b-box valve. There is, however, no fundamental reason that SRP could not be fed through the existing lead pipe in the opposite direction.

Connection of Couplings

With ample SRP exposed at each end of the pipe run, the couplings as disclosed herein, including the three-piece fittings and sleeve, can be mechanically connected. A visual inspection can be conducted at each segment of the new connections, ensuring a mechanically sound fit has been achieved.

SRP Pressurization

The installation contractor can return the b-box valve to the open position, allowing water to flow freely along the entirety of the waterline. The pressurization of the new waterline will enable the U-shaped SRP to open and expand to the original pipe diameter, while maintaining the required design pressure of the host pipe. Before backfilling the b-box, a final inspection can be conducted to ensure that the coupling assemblies are leak-free.

Test Data for Semi-Rigid Pipe

In one or more aspects of the present disclosure, the semi-rigid pipe can comprise thermoplastic polyurethane (TPU) elastomer. Tables 5-8 provide the results of tests performed by BASF on the Elastollan TPU. Table 5 shows the results of durability testing performed in water at a temperature of 60° C. for a period in excess of 9 years. Table 5. BASF Test 1—Product Life Cycle Analyses

| Product | Elastolan (Polyether grade) | | No: | L-74/99 |
|---|---|---|---|---|
| Batch | 301890 | Client: WeigeIt | Date: | |
| Additives | | | Sheet: | |
| Notes | Temp: +60° C. (+140° F.) | Points 342 | | |
| Property | Method | Value | Unit | |

| Property | Method | Value | Unit |
|---|---|---|---|
| Density | DIN EN ISO 1183-1-A | | g/cm³ |
| Shore Hardness A/D | DIN 53505 | 87 | Shore |
| Tensile Strength | DIN 53504-S2 | 46 | MPa |
| Tension at 10%/20%/50% | DIN 53504-S2 | | MPa |
| Tension at 100%/150%/300% | DIN 53504-S2 | | MPa |
| Elongation at Break (EAB) | DIN 53504-S2 | 640 | % |
| Rear Resistance | DIN ISO 34-1 Bb | | N/mm |
| Abrasion | DIN ISO 4649 A | | mm³ |
| Compression Value Set: 20° C., 70° C., DBL | DIN ISO 815 | | % |
| E-Module | DIN EN ISO 527-2/1A/1 | | MPa |
| Initial Values Corresponding to Initial Spec. | Confirmed | | |

| Durability Tests in: Water | | | | | Elongation and Shore Hardness | | | | Temp. | 60° C. | |
|---|---|---|---|---|---|---|---|---|---|---|---|
| | | | Tensile Strength | | Elongation at Break | | Shore Hardness | | Weight | Volume | L- |
| Exposure Test | | | | Diff. | | Diff. | | Diff. | Diff. | Diff. | Value |
| [h] | [d] | [w] | [MPa] | [%] | [%] | [%] | [A] | Diff. | [%] | [%] | [-] |
| 0 | 0 | 0 | 46 | — | 640 | — | 87 | — | — | — | — |
| 168 | 7 | 1 | 36 | −22 | 660 | +3 | | | | | |
| 4368 | 182 | 26 | 33 | −28 | 700 | +9 | | | | | |
| 8736 | 364 | 52 | 34 | −26 | 710 | +11 | | | | | |
| 13152 | 548 | 78 | 30 | −35 | 710 | +11 | | | | | |
| 17520 | 730 | 104 | 29 | −37 | 680 | +6 | | | | | |
| 21888 | 912 | 130 | 29 | −37 | 760 | +19 | | | | | |
| 26256 | 1094 | 156 | 26 | −43 | 770 | +20 | | | | | |
| 30624 | 1276 | 182 | 26 | −43 | 690 | +8 | | | | | |
| 34992 | 1458 | 208 | 23 | −50 | 720 | +13 | | | | | |
| 39360 | 1640 | 234 | 23 | −50 | 740 | +16 | | | | | |
| 43728 | 1822 | 260 | 20 | −57 | 750 | +17 | | | | | |
| 48096 | 2004 | 286 | 20 | −57 | 750 | +17 | | | | | |
| 52464 | 2186 | 312 | 20 | −57 | 790 | +23 | | | | | |
| 56832 | 2368 | 338 | 19 | −59 | 750 | +17 | | | | | |
| 61200 | 2550 | 364 | 18 | −61 | 940 | +47 | | | | | |
| 65568 | 2732 | 390 | 18 | −61 | 770 | +20 | | | | | |
| 72288 | 3012 | 430 | 17 | −63 | 780 | +22 | | | | | |
| 76656 | 3194 | 456 | 16 | −65 | 760 | +19 | | | | | |
| 81024 | 3376 | 482 | 17 | −63 | 780 | +22 | | | | | |
| 85392 | 3558 | 508 | | | | | | | | | |
| 89760 | 3740 | 534 | | | | | | | | | |

Notes and Observations

1. The Test was prolonged to a retention of 37% at 81,024 hrs (9 years)
2. The Elongation at break increases over time
3. No cracks were observed.

Figure 16:
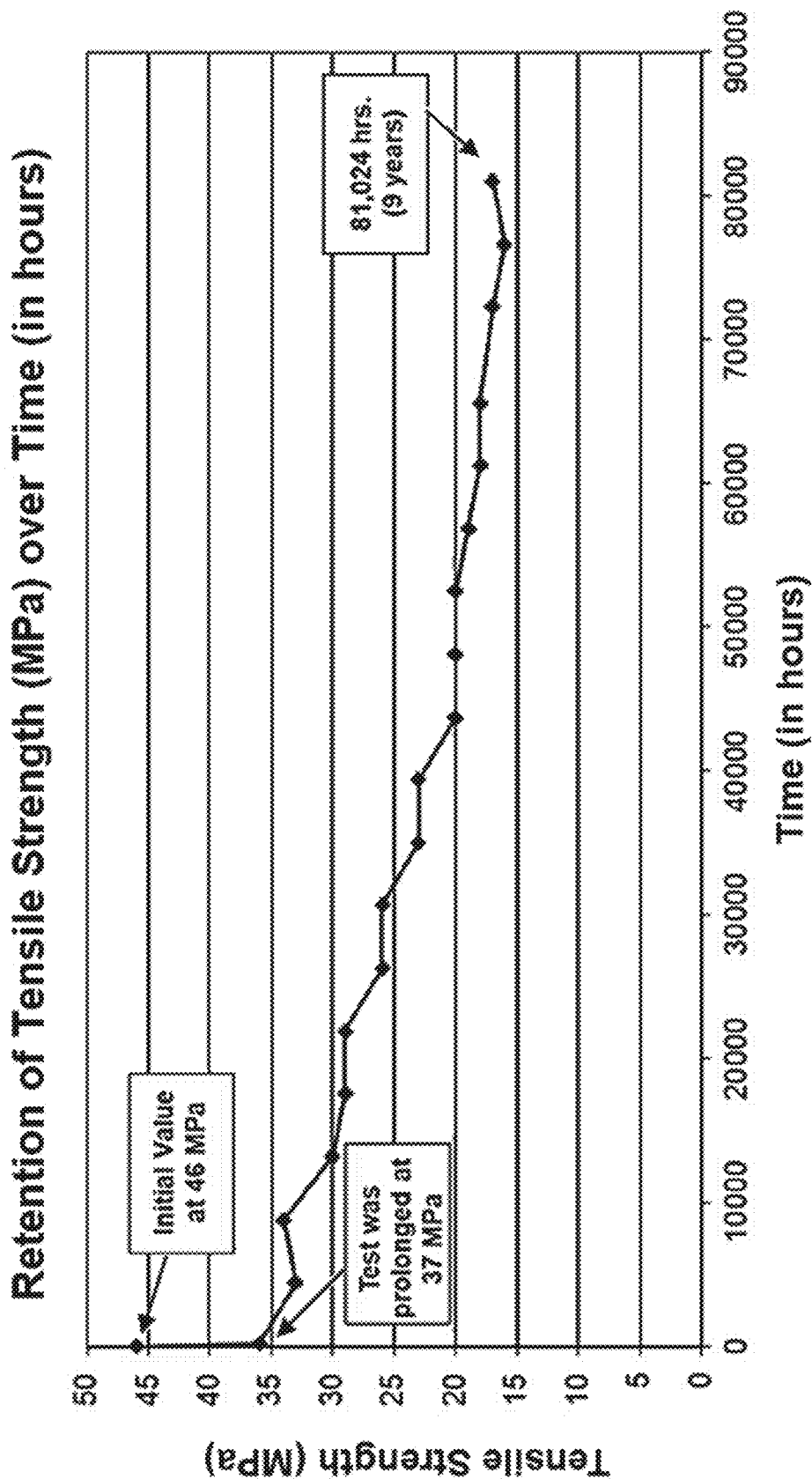
FIG. 16 presents a graph of tensile strength as a function of time of a material for use in a semi-rigid pipe in accordance with one or more aspects of the invention.

FIG. 16 presents a graph showing the tensile strength of Elastollan® as a function of time.

Figure 17:
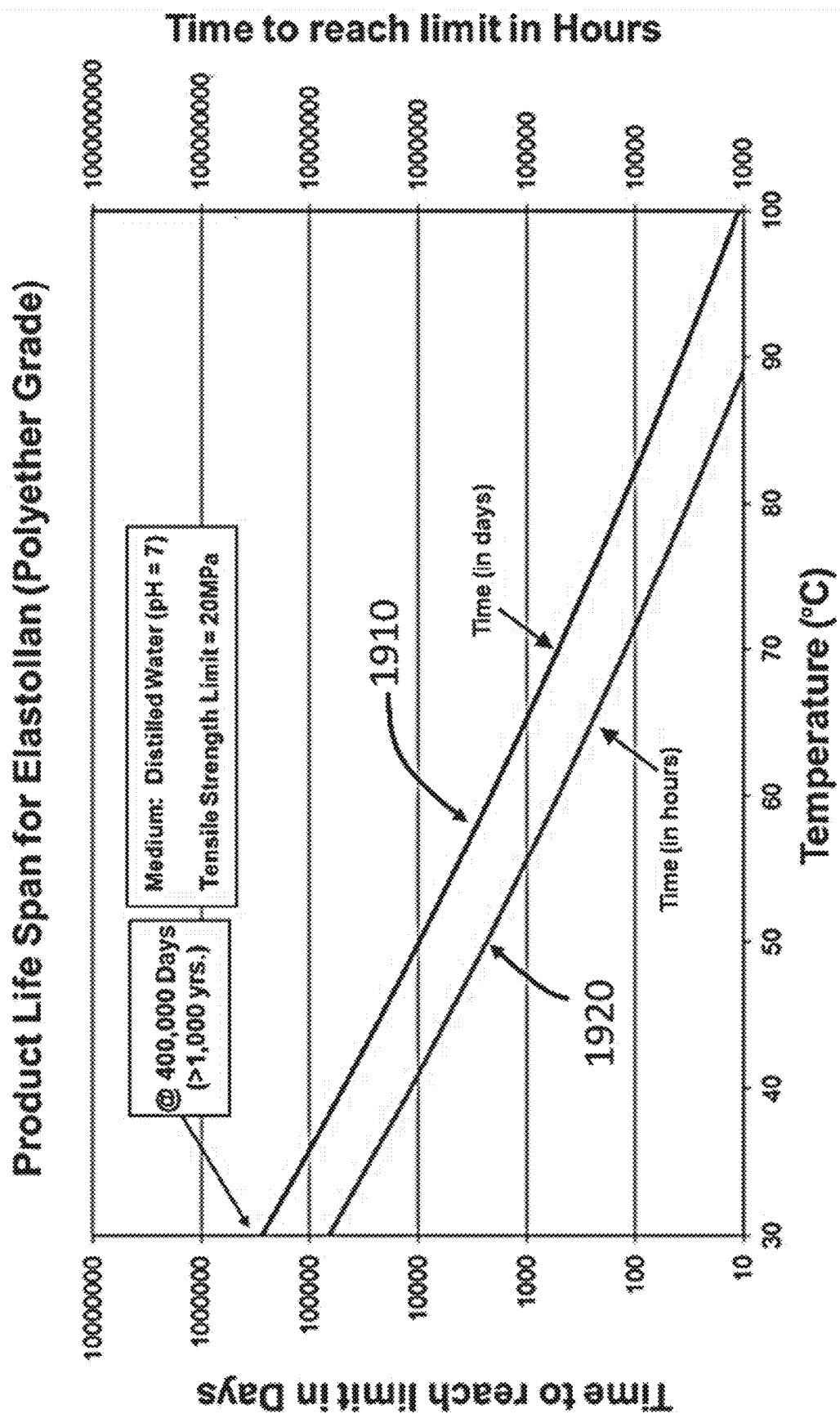
FIG. 17 presents a graph of product lifespan as a function of temperature for a material for use in a semi-rigid pipe in accordance with one or more aspects of the invention.

FIG. 17 depicts the product life span of Elastollan® when in water (pH=7). The time (in days 1710 and in hours 1720) for the tensile strength limit of 20 MPa to be reached as a function of temperature.

Tables 6-8 show durability results for Elastollan® in chlorine at 23° C. where the concentrations of chlorine are 0.5 parts per million (ppm), 5 ppm, and 15 ppm, respectively. The duration of each of these three tests was 12 weeks.

TABLE 6

BASF Aging Test Report 2-Thermoplastic Polyurethane

| Product | Elastollan (Polyether grade TPU) | | No: | 080007558-4 |
|---|---|---|---|---|
| Batch | 322613 | Client: Pallas | Date: | 12.12.2014 |
| Additives | | | Sheet: | |
| Notes: | See notes below | Points 118 | | |

| Property | Method | Value | Unit |
|---|---|---|---|
| Density | DIN EN ISO 1183-1-A | | g/cm³ |
| Shore Hardness A/D | DIN 53505 | 87 | Shore |
| Tensile Strength | DIN 53504-S2 | 46 | MPa |
| Tension at 10%/20%/50% | DIN 53504-S2 | | MPa |
| Tension at 100%/150%/300% | DIN 53504-S2 | | MPa |
| Elongation at Break (EAB) | DIN 53504-S2 | 580 | % |
| Rear Resistance | DIN ISO 34-1 Bb | | N/mm |
| Abrasion | DIN ISO 4649 A | | mm³ |
| Compression Value Set: 20° C., 70° C., DBL | DIN ISO 815 | | % |
| E-Module | DIN EN ISO 527-2/1A/1 | | MPa |
| Initial Values Corresponding to Initial Spec. | Confirmed | | |

| Durability Tests in: Chlorine | Chemical-Chlorine at 0.5 ppm | | | | | | | 23° C. | | |
|---|---|---|---|---|---|---|---|---|---|---|
| Exposure Test | | | Tensile Strength | | Elongation at Break | | Shore Hardness | | Temp. Weight | Volume | L-Value |
| [h] | [d] | [w] | [MPa] | Diff. [%] | [%] | Diff. [%] | [A] | Diff. | Diff. [%] | Diff. [%] | [-] |
| 0 | 0 | 0 | 46 | — | 580 | — | 87 | — | — | — | — |
| 672 | 28 | 4 | 44 | −4 | 650 | +12 | 87 | 0 | 1.2 | 1.1 | |
| 1344 | 56 | 8 | 44 | −4 | 660 | +14 | 87 | 0 | 1.1 | 1.1 | |
| 2016 | 84 | 12 | 46 | 0 | 690 | +19 | 86 | −1 | 1.2 | 1.1 | |

Notes and Observations
4. Tests were administered 15 minutes after removal.
5. Temperature +23 C. (73 F.).
6. No changes in Tensile strength after 84 days. Elongation at break (+19%).
7. No cracks were observed.
8. Shore hardness maintained @ 0 diff .; indicating no brittleness.

TABLE 7

BASF Aging Test Report 3-Thermoplastic Polyurethane

| Product | Elastollan (Polyether grade TPU) | | No: | 080007558-6 |
|---|---|---|---|---|
| Batch | 322613 | Client: Pallas | Date: | 12.12.2014 |
| Additives | | | Sheet: | |
| Notes: | See notes below | Points 118 | | |

| Property | Method | Value | Unit |
|---|---|---|---|
| Density | DIN EN ISO 1183-1-A | | g/cm³ |
| Shore Hardness A/D | DIN 53505 | 87 | Shore |
| Tensile Strength | DIN 53504-S2 | 46 | MPa |
| Tension at 10%/20%/50% | DIN 53504-S2 | | MPa |
| Tension at 100%/150%/300% | DIN 53504-S2 | | MPa |
| Elongation at Break (EAB) | DIN 53504-S2 | 580 | % |
| Rear Resistance | DIN ISO 34-1 Bb | | N/mm |
| Abrasion | DIN ISO 4649 A | | mm³ |
| Compression Value Set: 20° C., 70° C., DBL | DIN ISO 815 | | % |
| E-Module | DIN EN ISO 527-2/1A/1 | | MPa |
| Initial Values Corresponding to Initial Spec. | Confirmed | | |

TABLE 7-continued

BASF Aging Test Report 3-Thermoplastic Polyurethane

| Durability Tests in: Chlorine | | | Chemical-Chlorine at 5 ppm | | | | | | 23° C. | | |
|---|---|---|---|---|---|---|---|---|---|---|---|
| | | | Tensile Strength | | Elongation at Break | | Shore | | Temp. | | L- |
| Exposure Test | | | | Diff. | | Diff. | Hardness | | Weight | Volume | Value |
| [h] | [d] | [w] | [MPa] | [%] | [%] | [%] | [A] | Diff. | Diff. [%] | Diff. [%] | [-] |
| 0 | 0 | 0 | 46 | — | 580 | — | 87 | — | — | — | — |
| 672 | 28 | 4 | 43 | −7 | 620 | +7 | 87 | 0 | 1.2 | 1.2 | |
| 1344 | 56 | 8 | 45 | −2 | 630 | +9 | 87 | 0 | 1.1 | 1.0 | |
| 2016 | 84 | 12 | 47 | +2 | 690 | +19 | 87 | 0 | 1.2 | 1.1 | |

Notes and Observations
1. Tests were administered 15 minutes after removal.
2. Temperature +23 C. (73 F.).
3. No changes in Tensile strength after 84 days. Elongation at break (+19%).
4. No cracks were observed.
5. Shore hardness maintained @ 0 diff.; indicating no brittleness.

TABLE 8

BASF Aging Test Report 4-Thermoplastic Polyurethane

| Product | Elastollan (Polyether grade TPU) | | No: | 080007558-8 |
|---|---|---|---|---|
| Batch | 322613 | Client: Pallas | Date: | 12.12.2014 |
| Additives Notes: | See notes below | Points 118 | Sheet: | |
| Property | Method | | Value | Unit |
| Density | DIN EN ISO 1183-1-A | | | g/cm³ |
| Shore Hardness A/D | DIN 53505 | | 87 | Shore |
| Tensile Strength | DIN 53504-S2 | | 46 | MPa |
| Tension at 10%/20%/50% | DIN 53504-S2 | | | MPa |
| Tension at 100%/150%/300% | DIN 53504-S2 | | | MPa |
| Elongation at Break (EAB) | DIN 53504-S2 | | 580 | % |
| Rear Resistance | DIN ISO 34-1 Bb | | | N/mm |
| Abrasion | DIN ISO 4649 A | | | mm³ |
| Compression Value Set: 20° C., 70° C., DBL | DIN ISO 815 | | | % |
| E-Module | DIN EN ISO 527-2/1A/1 | | | MPa |
| Initial Values Corresponding to Initial Spec. | Confirmed | | | |

| Durability Tests in: Chlorine | | | Chemical-Chlorine at 15ppm | | | | | | 23° C. | | |
|---|---|---|---|---|---|---|---|---|---|---|---|
| | | | Tensile Strength | | Elongation at break | | Shore | | Temp. | | L- |
| Exposure Test | | | | Diff. | | Diff. | Hardness | | Weight | Volume | Value |
| [h] | [d] | [w] | [MPa] | [%] | [%] | [%] | [A] | Diff. | Diff. [%] | Diff. [%] | [-] |
| 0 | 0 | 0 | 46 | — | 580 | — | 87 | — | — | — | — |
| 672 | 28 | 4 | 44 | −4 | 650 | +12 | 87 | 0 | 1.2 | 1.1 | |
| 1344 | 56 | 8 | 47 | +2 | 670 | +16 | 87 | 0 | 1.1 | 1.2 | |
| 2016 | 84 | 12 | 43 | −7 | 690 | +19 | 87 | 0 | 1.2 | 1.1 | |

Notes and Observations
1. Tests were administered 15 minutes after removal.
2. Temperature +23 C. (73 F. ).
3. No changes in Tensile strength after 84 days. Elongation at break (+19%).
4. No cracks were observed.
5. Shore hardness maintained @ 0 diff.; indicating no brittleness.

To ensure health and safety, anyone installing one or more aspects of the present disclosure makes sure that the handling and site staging of materials are done in accordance with the Safety Data Sheet and installation information. As such, it is recommended that the installer perform a pre-installation inspection and post-installation inspection of both the coupling assemblies and the flexible pipe.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects can become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system comprising:
a semi-rigid pipe comprising a flexible tube with a first end, a second end opposite the first end, and a segment connecting the first end and the second end, the semi-rigid pipe configured to be disposed inside a first existing pipe;
a pair of coupling assemblies comprising first and second coupling assemblies disposed over and sealingly coupled to the first and second ends, respectively, of the semi-rigid pipe, each coupling assembly comprising:
a coupling comprising:
a coupling proximal end including:
a nipple with a first outer diameter and configured to receive by friction-tight fit and be disposed inside the semi-rigid pipe; and
a first external thread with a diameter greater than an outer diameter of the semi-rigid pipe and disposed at a distal end of the nipple;
a coupling distal end disposed opposite the coupling proximal end including a second external thread and configured to form a fluid-tight seal with one of two additional existing pipes;
an intermediary section disposed between the first external thread and the second external thread and configured to allow the coupling to be held and threaded securely;
a compression nut comprising:
a compression nut distal end that includes:
internal threads configured to mate with the first external threads of the coupling; and
an outer surface configured to be held securely to allow the compression nut to thread over the coupling;
a compression nut proximal end disposed opposite the compression nut distal end; and
an inner surface that tapers inward from the compression nut distal end to the compression nut proximal end such that threading the compression nut onto the coupling presses the semi-rigid pipe against the nipple to form a fluid-tight seal, and
a sleeve associated with each coupling assembly, each sleeve comprising:
a first sleeve end configured to receive and securely clamp over the first existing pipe; and
a second sleeve end configured to receive and securely clamp over the proximal end of the compression nut,
wherein the sleeve associated with each coupling assembly comprises a plurality of shells that when assembled form a tubular shape, and wherein the plurality of shells are held together by a plurality of fasteners,
wherein the system is configured to be fluid-tight from the first additional existing pipe to the second additional existing pipe, providing a channel for fluid flow between the two additional existing pipes, and
wherein proximal and distal refer to position relative to the segment of the semi-rigid pipe connecting the first end to the second end.

2. The system of claim 1, wherein:
at least one coupling assembly further comprises a flare nut, the flare nut comprising:
an internally threaded proximal end configured to mate with the second external thread of the respective coupling and sealingly connect one of the additional existing pipes to the respective coupling distal end; and
an outer surface configured to be held securely to facilitate threading the flare nut over the coupling,
wherein at least one additional existing pipe comprises a flared proximal end, and
wherein the coupling further comprises a distal end shaped to mate with the flared proximal end of the at least one additional existing pipe.

3. The system of claim 1, wherein at least one of the coupling, the compression nut, the nut, and the sleeve comprises at least one of brass, steel, or plastic.

4. The system of claim 1, wherein an outer surface of the nipple is smooth.

5. The system of claim 1, wherein the fasteners comprise bolts configured to be received by complementary holes in adjacent pairs of shells.

6. The system of claim 1, wherein the fluid comprises water.

7. The system of claim 1, wherein the fluid comprises potable water.

8. The system of claim 1, wherein the first existing pipe comprises toxic material.

9. The system of claim 1, wherein the first additional existing pipe comprises a Buffalo box of a water supply system and the second additional existing pipe comprises a water line in a residential or commercial structure.

10. The system of claim 1, wherein the semi-rigid pipe comprises at least one of a group comprising cellulose acetate butyrate, ABS, PVDF, RCO, PET, polypropylene, HDPE, thermoplastic polyurethane, and PVC.

11. The system of claim 1, wherein the nipple is tapered to conform to the tapered inner surface of the compression nut.

12. A supersystem comprising:
a plurality of systems of claim 1,
wherein adjacent systems of the plurality of systems are configured to be disposed on opposite ends of existing plumbing and to allow fluid flow from a first end of the supersystem to a second end of the supersystem.

13. The supersystem of claim 12, wherein the plurality of systems comprises two systems and the existing plumbing comprises a b-box.

14. A method comprising:
providing the system of claim 1;
passing the semi-rigid pipe through the first existing pipe;
coupling the semi-rigid pipe at each end of the semi-rigid pipe to a respective pipe of the additional existing pipes using a respective coupling assembly of the pair of coupling assemblies by:
sliding the compression nut over the respective end of the semi-rigid pipe;
connecting the distal end of the coupling to the respective additional existing pipe;
sliding the semi-rigid pipe over the nipple;
threading the compression nut onto the coupling, pressing the semi-rigid pipe onto the nipple; and
wherein the system is configured to be fluid-tight from the first additional existing pipe to the second additional existing pipe,
wherein proximal and distal refer to position relative to the semi-rigid pipe, and
wherein the system is configured to form a fluid-tight seal from a first to a second of the two additional existing pipes, providing a channel for fluid flow between the two additional existing pipes.

15. The method of claim 14, further comprising:
providing a sleeve comprising:
a first sleeve end configured to receive and securely clamp over the first existing pipe; and
a second sleeve end configured to receive and securely clamp over the proximal end of the compression nut; and
clamping the first and second sleeve ends over the first existing pipe and the proximal end of the compression nut, respectively.

16. The method of claim 14, further comprising removing any twist in the semi-rigid pipe.

17. The method of claim 14, further comprising at least one flare nut, the at least one flare nut comprising:
an internally threaded proximal end configured to mate with the second external thread of the respective coupling and sealingly connect one of the additional existing pipes to the respective coupling distal end; and
an outer surface configured to be held securely to facilitate threading the flare nut over the coupling,
wherein the coupling further comprises a distal end shaped to mate with the flared proximal end of the at least one additional existing pipe,
wherein for at least one coupling assembly, connecting the distal end of the coupling to the respective additional existing pipe comprises:
sliding the at least one flare nut over the respective additional existing pipe;
flaring the proximal end of the respective additional existing pipe;
mating the flared proximal end of the respective additional existing pipe to the distal end of the coupling; and
threading the flare nut onto the distal end of the coupling.

18. The method of claim 14, wherein the semi-rigid pipe comprises at least one of a group comprising cellulose acetate butyrate, ABS, PVDF, RCO, PET, polypropylene, HDPE, thermoplastic polyurethane, and PVC.

19. The method of claim 14, wherein the nipple is tapered to conform to the tapered inner surface of the compression nut.

20. A coupling assembly comprising:
a coupling configured to be disposed to a semi-rigid pipe on a coupling proximal end that is proximal to the semi-rigid pipe, comprising:
the coupling proximal end including:
a nipple with a first outer diameter and configured to receive by friction-tight fit and be disposed inside the semi-rigid pipe; and
a first external thread with a diameter greater than an outer diameter of the semi-rigid pipe and disposed at the distal end of the nipple;
a coupling distal end disposed opposite the coupling proximal end including a second external thread and configured to form a fluid-tight seal with a first existing pipe;
an intermediary section disposed between the first external thread and the second external thread and configured to allow the coupling to be held and threaded securely; and
a compression nut comprising:
a compression nut distal end that includes:
internal threads configured to mate with the first external threads of the coupling; and
an outer surface configured to be held securely to allow the compression nut to thread over the coupling;
a compression nut proximal end disposed opposite the compression nut distal end; and
an inner surface that tapers down from the compression nut distal end to the compression nut proximal end such that threading the compression nut onto the coupling presses the semi-rigid pipe against the nipple to form a fluid-tight seal,
wherein the coupling assembly is configured to be disposed over and sealingly coupled to an end of the semi-rigid pipe,
wherein proximal and distal refer to position relative to the semi-rigid pipe, and wherein the coupling assembly is configured to form a fluid-tight seal from the semi-rigid pipe to a second existing pipe disposed, providing a channel for fluid flow between the semi-rigid pipe and a second existing pipe disposed at the distal end of the coupling, and a flare nut, the flare nut comprising:
  an internally threaded proximal end configured to mate with the second external thread of the respective coupling and sealingly connect the first existing pipe to the coupling distal end; and
  an outer surface configured to be held securely to facilitate threading the flare nut onto the coupling,
  wherein the first existing pipe comprises a flared proximal end, and
wherein the coupling further comprises a distal end shaped to mate with the flared proximal end of the first existing pipe.

21. The assembly of claim 20, wherein the coupling, the compression nut, the nut, and the sleeve comprises at least one of brass, steel, or plastic.

22. The assembly of claim 20, wherein an outer surface of the nipple is smooth.

23. The assembly of claim 20, further comprising:
a sleeve associated with the coupling assembly, the sleeve comprising:
  a first sleeve end configured to receive and securely clamp over the first existing pipe; and
  a second sleeve end configured to receive and securely clamp over the proximal end of the compression nut,
  wherein the sleeve comprises a plurality of shells that when assembled form a tubular shape, and wherein the plurality of shells are held together by a plurality of fasteners,
  wherein the sleeve comprises a plurality of shells that when assembled form a tubular shape, and wherein the plurality of shells are held together by a plurality of fasteners.

24. The assembly of claim 23, wherein the fasteners comprise bolts configured to be received by complementary holes in adjacent pairs of shells.

25. The assembly of claim 20, wherein the fluid comprises water.

26. The assembly of claim 25, wherein the fluid comprises potable water.

27. The coupling assembly of claim 20, wherein the semi-rigid pipe comprises at least one of a group comprising cellulose acetate butyrate, ABS, PVDF, RCO, PET, polypropylene, HDPE, thermoplastic polyurethane, and PVC.

28. The coupling assembly of claim 20, wherein the nipple is tapered to conform to the tapered inner surface of the compression nut.

29. A system comprising:
a semi-rigid pipe comprising a flexible tube with a first end, a second end opposite the first end, and a segment connecting the first end and the second end, the semi-rigid pipe configured to be disposed inside an existing lead pipe;
a pair of coupling assemblies comprising first and second assemblies disposed over and sealingly coupled to the first and second ends, respectively, of the semi-rigid pipe, each assembly comprising:
  a coupling comprising:
    a coupling proximal end including:
      a nipple with a first outer diameter and configured to receive by friction-tight fit and be disposed inside the semi-rigid pipe; and
      a first external thread with a diameter greater than an outer diameter of the semi-rigid pipe and disposed at the distal end of the nipple;
    a coupling distal end disposed opposite the coupling proximal end including a second external thread and configured to form a fluid-tight seal with one of two additional existing pipes;
    an intermediary section disposed between the first external thread and the second external thread and configured to allow the coupling to be held and threaded securely; and
  a compression nut comprising:
    a compression nut distal end that includes:
      internal threads configured to mate with the first external threads of the coupling; and
      an outer surface configured to be held securely to allow the compression nut to thread over the coupling;
    a compression nut proximal end disposed opposite the compression nut distal end; and
    an inner surface that tapers inward from the compression nut distal end to the compression nut proximal end such that threading the compression nut onto the coupling presses the semi-rigid pipe against the nipple to form a fluid-tight seal, and
a sleeve associated with each coupling assembly, each sleeve comprising:
  a first sleeve end configured to receive and securely clamp over the first existing pipe; and
  a second sleeve end configured to receive and securely clamp over the proximal end of the compression nut,
  wherein the sleeve associated with each coupling assembly comprises a plurality of shells that when assembled form a tubular shape, and wherein the plurality of shells are held together by a plurality of fastener,
wherein the system is configured to be fluid-tight from the first additional existing pipe to the second additional existing pipe, providing a channel for fluid flow between the two additional existing pipes; and
wherein proximal and distal refer to position relative to the segment of the semi-rigid pipe connecting the first end to the second end.

* * * * *